(12) United States Patent
Lee et al.

(10) Patent No.: US 12,279,231 B2
(45) Date of Patent: Apr. 15, 2025

(54) TERMINAL AND METHOD FOR TRANSMITTING SIGNAL IN WIRELESS COMMUNICATION SYSTEM

(71) Applicant: LG ELECTRONICS INC., Seoul (KR)

(72) Inventors: Seungmin Lee, Seoul (KR); Hyukjin Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 722 days.

(21) Appl. No.: 17/279,822

(22) PCT Filed: Sep. 25, 2019

(86) PCT No.: PCT/KR2019/012452
§ 371 (c)(1),
(2) Date: Mar. 25, 2021

(87) PCT Pub. No.: WO2020/067713
PCT Pub. Date: Apr. 2, 2020

(65) Prior Publication Data
US 2021/0400634 A1 Dec. 23, 2021

Related U.S. Application Data

(60) Provisional application No. 62/739,141, filed on Sep. 28, 2018.

(51) Int. Cl.
*H04W 72/02* (2009.01)
*H04W 72/0446* (2023.01)
(Continued)

(52) U.S. Cl.
CPC ....... *H04W 72/02* (2013.01); *H04W 72/0446* (2013.01); *H04W 72/0453* (2013.01); *H04W 72/1263* (2013.01)

(58) Field of Classification Search
None
See application file for complete search history.

(56) References Cited

U.S. PATENT DOCUMENTS 11,737,054 B2 * 8/2023 Xu .......................... H04W 4/40
370/329
2009/0262696 A1 10/2009 Wei et al.
(Continued)

FOREIGN PATENT DOCUMENTS

KR  1020120098767 A  9/2012
WO     2017176096 A1  10/2017

OTHER PUBLICATIONS

Xinwei, "Consideration on V2V sub-channelization", 3GPP TSG RAN WG1 Meeting #86, Aug. 22-26, 2016, R1-166576.
(Continued)

*Primary Examiner* — Kouroush Mohebbi
(74) *Attorney, Agent, or Firm* — BRYAN CAVE LEIGHTON PAISNER LLP

(57) ABSTRACT

An embodiment of the present invention provides a method for transmitting a signal by a terminal in a wireless communication system, the method comprising a step of the terminal selecting a transmission resource, and a step of the terminal transmitting the signal to another terminal by using the selected transmission resource, wherein the transmission resource includes a first transmission resource range for transmission of the first signal, and a second transmission resource range for transmission of a second signal and wider than the first transmission resource range, wherein the first transmission resource range and the second transmission resource range are mapped onto different subchannel indices, and the first transmission resource range is allocated to an edge of a frequency range for the transmission of the first signal and the second signal.

12 Claims, 18 Drawing Sheets

(51) Int. Cl.
*H04W 72/0453* (2023.01)
*H04W 72/1263* (2023.01)

(56) References Cited

U.S. PATENT DOCUMENTS

2020/0017124 A1\* 1/2020 Camhi .............. B60W 60/0053
2020/0275458 A1\* 8/2020 Khoryaev ............. H04W 72/12

OTHER PUBLICATIONS

Intel Corporation, "Scenarios, Traffic Models and Performance Metrics for eV2X Evaluations", 3GPP TSG RAN WG1 Meeting #93, May 21-25, 2018, R1-1806538.

\* cited by examiner (a) DMRS location for Rel. 12/13 PSBCH (b) DMRS location for V2V PSBCH (a)

(b)

(a)

(b)

TERMINAL AND METHOD FOR TRANSMITTING SIGNAL IN WIRELESS COMMUNICATION SYSTEM

This application is the National Stage filing under 35 U.S.C. 371 of International Application No. PCT/KR2019/012452, filed on Sep. 25, 2019, which claims priority to U.S. Provisional Application No. 62/739,141, filed on Sep. 28, 2018, the contents of which are hereby incorporated by reference herein in their entirety.

TECHNICAL FIELD

The present disclosure relates to a wireless communication system and, more particularly, to a method and terminal for transmitting a signal.

BACKGROUND ART

As more and more communication devices demand larger communication capacities, the need for enhanced mobile broadband communication relative to the legacy radio access technologies (RATs) has emerged. Massive machine type communication (mMTC) that provides various services by interconnecting multiple devices and things irrespective of time and place is also one of main issues to be addressed for future-generation communications. A communication system design considering services/user equipments (UEs) sensitive to reliability and latency is under discussion as well. As such, the introduction of a future-generation RAT considering enhanced mobile broadband (eMBB), mMTC, ultra-reliability and low latency communication (URLLC), and so on is being discussed. For convenience, this technology is referred to as new RAT (NR) in the present disclosure. NR is an exemplary 5th generation (5G) RAT.

A new RAT system including NR adopts orthogonal frequency division multiplexing (OFDM) or a similar transmission scheme. The new RAT system may use OFDM parameters different from long term evolution (LTE) OFDM parameters. Further, the new RAT system may have a larger system bandwidth (e.g., 100 MHz), while following the legacy LTE/LTE-advanced (LTE-A) numerology. Further, one cell may support a plurality of numerologies in the new RAT system. That is, UEs operating with different numerologies may co-exist within one cell.

Vehicle-to-everything (V2X) is a communication technology of exchanging information between a vehicle and another vehicle, a pedestrian, or infrastructure. V2X may cover four types of communications such as vehicle-to-vehicle (V2V), vehicle-to-infrastructure (V2I), vehicle-to-network (V2N), and vehicle-to-pedestrian (V2P). V2X communication may be provided via a PC5 interface and/or a Uu interface.

DISCLOSURE

Technical Problem

The present disclosure proposes a method of preventing/reducing a phenomenon (resource fragmentation) that transmission of a large packet is disturbed when a specific UE partially occupies resource(s) in a scheduling mode in which UEs autonomously select resources for direct communication therebetween.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In one aspect of the present disclosure, a method of transmitting a signal by a user equipment (UE) in a wireless communication system is provided. The method may include: selecting, by the UE, a transmission resource; and transmitting the signal on the selected transmission resource to another UE. The transmission resource may include a first transmission resource region for transmission of a first signal and a second transmission resource region for transmission of a second signal, wherein the second transmission resource region may be greater than the first transmission resource region. The first and second transmission resource regions may be mapped to different subchannel indices. The first transmission resource region may be allocated to edges of a frequency region for transmitting the first and second signals.

The first transmission resource region may be mapped to a subchannel index greater than a first threshold or smaller than a second threshold, and the second transmission resource region may be mapped to a subchannel index smaller than or equal to the first threshold and greater than or equal to the second threshold. The first threshold may be greater than the second threshold.

The first transmission resource region may be mapped to a minimum subchannel index and a maximum subchannel index, and the second transmission resource region may be mapped to a subchannel index except the minimum and maximum subchannel indices.

Transmitting the signal may include: when an amount of resources for transmitting the signal is greater than or equal to a third threshold, transmitting the signal as the second signal in the second resource region; and when the amount of resources for transmitting the signal is smaller than the third threshold, transmitting the signal as the first signal in the first resource region.

The method may further include, when the first transmission resource region overlaps with the second transmission resource region, dropping the transmission of the first signal or reselecting the first transmission resource.

The method may further include configuring and transmitting a time gap between control and data signals for the second signal.

The first and second transmission resource regions may be configured within a resource pool for transmission of a sidelink signal.

The first signal may be a narrowband signal, and the second signal may be a wideband signal.

In another aspect of the present disclosure, a UE for transmitting a signal in a wireless communication system is provided. The UE may include a transceiver and a processor. The processor may be configured to: select a transmission resource; and transmit the signal on the selected transmission resource to another UE. The transmission resource may include a first transmission resource region for transmission of a first signal and a second transmission resource region for transmission of a second signal, wherein the second transmission resource region may be greater than the first transmission resource region. The first and second transmission resource regions may be mapped to different subchannel indices. The first transmission resource region may be allocated to edges of a frequency region for transmitting the first and second signals.

Advantageous Effects

According to the present disclosure, a user equipment (UE) may be prohibited from selecting resources indiscreetly The present disclosure may provide a wireless communication system where a UE easily secures a transmission resource when the UE is configured with wideband transmission.

According to the present disclosure, a wideband transmission UE may perform transmission by applying a time gap between a physical sidelink control channel (PSCCH) and a physical sidelink shared channel (PSSCH) so that a narrowband transmission UE may efficiently detect (check) that narrowband transmission overlaps with wideband transmission.

According to the present disclosure, the sensing complexity of a UE may be reduced by dividing resource regions.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the disclosure, provide embodiments of the present disclosure together with detail explanation. Yet, a technical characteristic of the present disclosure is not limited to a specific drawing. Characteristics disclosed in each of the drawings are combined with each other to configure a new embodiment. Reference numerals in each drawing correspond to structural elements.

BEST MODE

Figure 1:
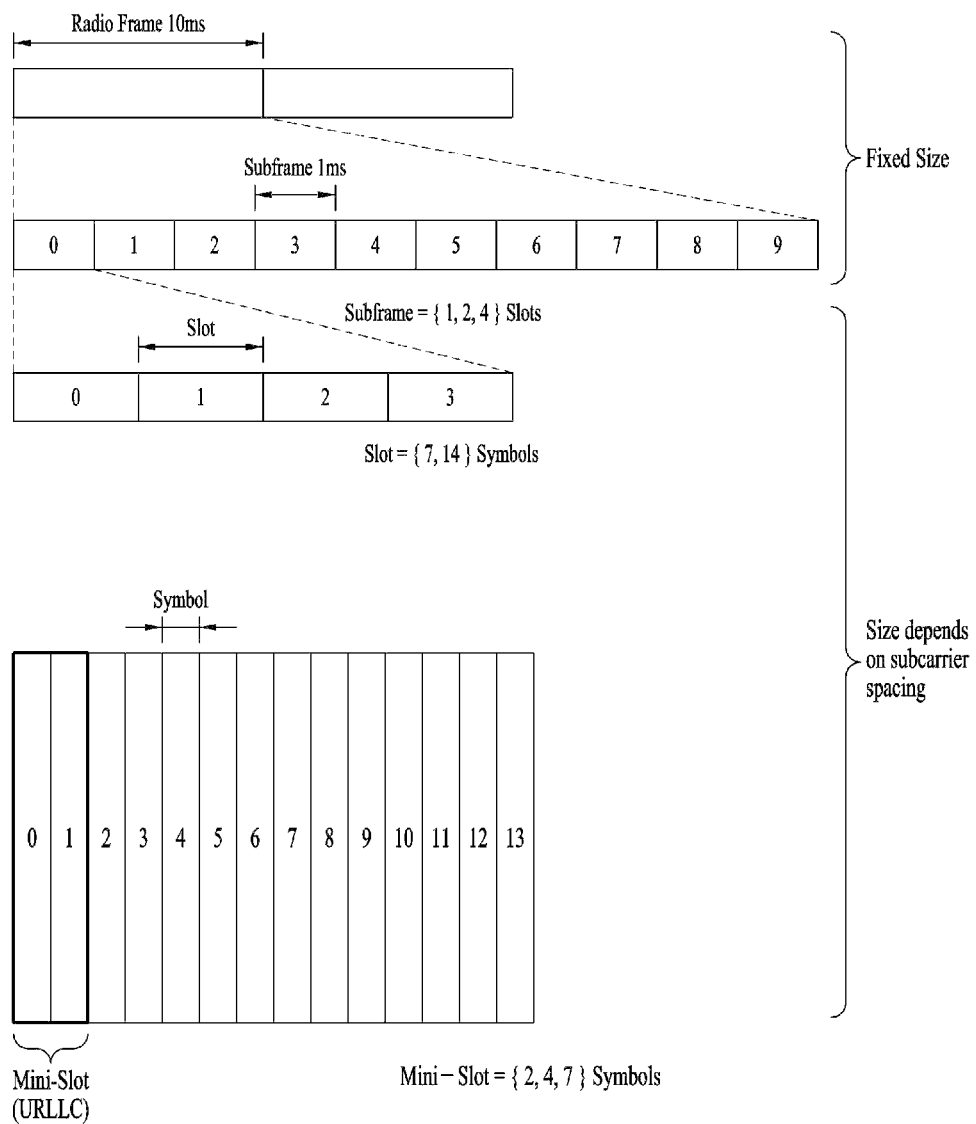
FIG. 1 illustrates a frame structure in new radio (NR)

In this document, downlink (DL) communication refers to communication from a base station (BS) to a user equipment (UE), and uplink (UL) communication refers to communication from the UE to the BS. In DL, a transmitter may be a part of the BS and a receiver may be a part of the UE. In UL, a transmitter may be a part of the UE and a receiver may be a part of the BS. Herein, the BS may be referred to as a first communication device, and the UE may be referred to as a second communication device. The term 'BS' may be replaced with 'fixed station', 'Node B', 'evolved Node B (eNB)', 'next-generation node B (gNB)', 'base transceiver system (BTS)', 'access point (AP)', 'network node', 'fifth-generation (5G) network node', 'artificial intelligence (AI) system', 'road side unit (RSU)', 'robot', etc. The term 'UE' may be replaced with 'terminal', 'mobile station (MS)', 'user terminal (UT)', 'mobile subscriber station (MSS)', 'subscriber station (SS)', 'advanced mobile station (AMS)', 'wireless terminal (WT)', 'machine type communication (MTC) device', 'machine-to-machine (M2M) device', 'device-to-device (D2D) device', 'vehicle', 'robot', 'AI module', etc.

The technology described herein is applicable to various wireless access systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented as radio technology such as universal terrestrial radio access (UTRA) or CDMA2000. The TDMA may be implemented as radio technology such as global system for mobile communications (GSM), general packet radio service (GPRS), or enhanced data rates for GSM evolution (EDGE). The OFDMA may be implemented as radio technology such as the Institute of Electrical and Electronics Engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). 3rd generation partnership project (3GPP) long term evolution (LTE) is a part of evolved UMTS (E-UMTS) using E-UTRA. LTE-advance (LTE-A) or LTE-A pro is an evolved version of 3GPP LTE. 3GPP new radio or new radio access technology (3GPP NR) is an evolved version of 3GPP LTE, LTE-A, or LTE-A pro.

Although the present disclosure is described based on 3GPP communication systems (e.g., LTE-A, NR, etc.) for clarity of description, the spirit of the present disclosure is not limited thereto. LTE refers to technologies beyond 3GPP technical specification (TS) 36.xxx Release 8. In particular, LTE technologies beyond 3GPP TS 36.xxx Release 10 are referred to as LTE-A, and LTE technologies beyond 3GPP TS 36.xxx Release 13 are referred to as LTE-A pro. 3GPP NR refers to technologies beyond 3GPP TS 38.xxx Release 15. LTE/NR may be called '3GPP system'. Herein, "xxx" refers to a standard specification number.

In the present disclosure, a node refers to a fixed point capable of transmitting/receiving a radio signal for communication with a UE. Various types of BSs may be used as the node regardless of the names thereof. For example, the node may include a BS, a node B (NB), an eNB, a pico-cell eNB (PeNB), a home eNB (HeNB), a relay, a repeater, etc. A device other than the BS may be the node. For example, a radio remote head (RRH) or a radio remote unit (RRU) may be the node. The RRH or RRU generally has a lower power level than that of the BS. At least one antenna is installed for each node. The antenna may refer to a physical antenna or mean an antenna port, a virtual antenna, or an antenna group. The node may also be referred to as a point.

In the present disclosure, a cell refers to a prescribed geographical area in which one or more nodes provide communication services or a radio resource. When a cell refers to a geographical area, the cell may be understood as the coverage of a node where the node is capable of providing services using carriers. When a cell refers to a radio resource, the cell may be related to a bandwidth (BW), i.e., a frequency range configured for carriers. Since DL coverage, a range within which the node is capable of transmitting a valid signal, and UL coverage, a range within which the node is capable of receiving a valid signal from the UE, depend on carriers carrying the corresponding signals, the coverage of the node may be related to the coverage of the cell, i.e., radio resource used by the node. Accordingly, the term "cell" may be used to indicate the service coverage of a node, a radio resource, or a range to which a signal transmitted on a radio resource can reach with valid strength.

In the present disclosure, communication with a specific cell may mean communication with a BS or node that provides communication services to the specific cell. In addition, a DL/UL signal in the specific cell refers to a DL/UL signal from/to the BS or node that provides communication services to the specific cell. In particular, a cell providing DL/UL communication services to a UE may be called a serving cell. The channel state/quality of the specific cell may refer to the channel state/quality of a communication link formed between the BS or node, which provides communication services to the specific cell, and the UE.

When a cell is related to a radio resource, the cell may be defined as a combination of DL and UL resources, i.e., a combination of DL and UL component carriers (CCs). The cell may be configured to include only DL resources or a combination of DL and UL resources. When carrier aggregation is supported, a linkage between the carrier frequency of a DL resource (or DL CC) and the carrier frequency of a UL resource (or UL CC) may be indicated by system information transmitted on a corresponding cell. The carrier frequency may be equal to or different from the center frequency of each cell or CC. A cell operating on a primary frequency may be referred to as a primary cell (PCell) or PCC, and a cell operating on a secondary frequency may be referred to as a secondary cell (SCell) or SCC. The SCell may be configured after the UE and BS establish a radio resource control (RRC) connection therebetween by performing an RRC connection establishment procedure, that is, after the UE enters the RRC_CONNECTED state. The RRC connection may mean a path that enables the RRC of the UE and the RRC of the BS to exchange an RRC message. The SCell may be configured to provide additional radio resources to the UE. The SCell and the PCell may form a set of serving cells for the UE depending on the capabilities of the UE. When the UE is not configured with carrier aggregation or does not support the carrier aggregation although the UE is in the RRC_CONNECTED state, only one serving cell configured with the PCell exists.

A cell supports a unique radio access technology (RAT). For example, transmission/reception in an LTE cell is performed based on the LTE RAT, and transmission/reception in a 5G cell is performed based on the 5G RAT.

The carrier aggregation is a technology for combining a plurality of carriers each having a system BW smaller than a target BW to support broadband. The carrier aggregation is different from OFDMA in that in the former, DL or UL communication is performed on a plurality of carrier frequencies each forming a system BW (or channel BW) and in the latter, DL or UL communication is performed by dividing a base frequency band into a plurality of orthogonal subcarriers and loading the subcarriers in one carrier frequency. For example, in OFDMA or orthogonal frequency division multiplexing (OFDM), one frequency band with a predetermined system BW is divided into a plurality of subcarriers with a predetermined subcarrier spacing, and information/data is mapped to the plurality of subcarriers. Frequency up-conversion is applied to the frequency band to which the information/data is mapped, and the information/data is transmitted on the carrier frequency in the frequency band. In wireless carrier aggregation, multiple frequency bands, each of which has its own system BW and carrier frequency, may be simultaneously used for communication, and each frequency band used in the carrier aggregation may be divided into a plurality of subcarriers with a predetermined subcarrier spacing.

3GPP communication specifications define DL physical channels corresponding to resource elements carrying information originating from higher (upper) layers of physical layers (e.g., a medium access control (MAC) layer, a radio link control (RLC) layer, a protocol data convergence protocol (PDCP) layer, an RRC layer, a service data adaptation protocol (SDAP) layer, a non-access stratum (NAS) layer, etc.) and DL physical signals corresponding to resource elements which are used by physical layers but do not carry information originating from higher layers. For example, a physical downlink shared channel (PDSCH), a physical broadcast channel (PBCH), a physical multicast channel (PMCH), a physical control format indicator channel (PCFICH), and a physical downlink control channel (PDCCH) are defined as the DL physical channels, and a reference signal and a synchronization signal are defined as the DL physical signals. A reference signal (RS), which is called a pilot signal, refers to a predefined signal with a specific waveform known to both the BS and UE. For example, a cell-specific RS (CRS), a UE-specific RS (UE-RS), a positioning RS (PRS), a channel state information RS (CSI-RS), and a demodulation reference signal (DMRS) may be defined as DL RSs. In addition, the 3GPP communication specifications define UL physical channels corresponding to resource elements carrying information originating from higher layers and UL physical signals corresponding to resource elements which are used by physical layers but do not carry information originating from higher layers. For example, a physical uplink shared channel (PUSCH), a physical uplink control channel (PUCCH), and a physical random access channel (PRACH) are defined as the UL physical channels, and a demodulation reference signal (DMRS) for a UL control/data signal and a sounding reference signal (SRS) used for UL channel measurement are defined as the UL physical signals.

In the present disclosure, the PDCCH and the PDSCH may refer to a set of time-frequency resources or resource elements carrying downlink control information (DCI) of the physical layer and a set of time-frequency resources or resource elements carrying DL data thereof, respectively. The PUCCH, the PUSCH, and the PRACH may refer to a set of time-frequency resources or resource elements carrying uplink control information (UCI) of the physical layer, a set of time-frequency resources or resource elements carrying UL data thereof, and a set of time-frequency resources or resource elements carrying random access signals thereof, respectively. When it is said that a UE transmits a UL physical channel (e.g., PUCCH, PUSCH, PRACH, etc.), it may mean that the UE transmits DCI, UL data, or a random access signal on or over the corresponding UL physical channel When it is said that the BS receives a UL physical channel, it may mean that the BS receives DCI, UL data, a random access signal on or over the corresponding UL physical channel When it is said that the BS transmits a DL physical channel (e.g., PDCCH, PDSCH, etc.), it may mean that the BS transmits DCI or UL data on or over the corresponding DL physical channel When it is said that the UE receives a DL physical channel, it may mean that the UE receives DCI or UL data on or over the corresponding DL physical channel In the present disclosure, a transport block may mean the payload for the physical layer. For example, data provided from the higher layer or MAC layer to the physical layer may be referred to as the transport block.

In the present disclosure, hybrid automatic repeat request (HARQ) may mean a method used for error control. A HARQ acknowledgement (HARQ-ACK) transmitted in DL is used to control an error for UL data, and a HARQ-ACK transmitted in UL is used to control an error for DL data. A transmitter that performs the HARQ operation waits for an ACK signal after transmitting data (e.g. transport blocks or codewords). A receiver that performs the HARQ operation transmits an ACK signal only when the receiver correctly receives data. If there is an error in the received data, the receiver transmits a negative ACK (NACK) signal. Upon receiving the ACK signal, the transmitter may transmit (new) data but, upon receiving the NACK signal, the transmitter may retransmit the data. Meanwhile, there may be a time delay until the BS receives ACK/NACK from the UE and retransmits data after transmitting scheduling information and data according to the scheduling information. The time delay occurs due to a channel propagation delay or a time required for data decoding/encoding. Accordingly, if new data is transmitted after completion of the current HARQ process, there may be a gap in data transmission due to the time delay. To avoid such a gap in data transmission during the time delay, a plurality of independent HARQ processes are used. For example, when there are 7 transmission occasions between initial transmission and retransmission, a communication device may perform data transmission with no gap by managing 7 independent HARQ processes. When the communication device uses a plurality of parallel HARQ processes, the communication device may successively perform UL/DL transmission while waiting for HARQ feedback for previous UL/DL transmission.

In the present disclosure, CSI collectively refers to information indicating the quality of a radio channel (also called a link) created between a UE and an antenna port. The CSI includes at least one of a channel quality indicator (CQI), a precoding matrix indicator (PMI), a CSI-RS resource indicator (CRI), an SSB resource indicator (SSBRI), a layer indicator (LI), a rank indicator (RI), or a reference signal received power (RSRP).

In the present disclosure, frequency division multiplexing (FDM) may mean that signals/channels/users are transmitted/received on different frequency resources, and time division multiplexing (TDM) may mean that signals/channels/users are transmitted/received on different time resources.

In the present disclosure, frequency division duplex (FDD) refers to a communication scheme in which UL communication is performed on a UL carrier and DL communication is performed on a DL carrier linked to the UL carrier, and time division duplex (TDD) refers to a communication scheme in which UL and DL communication are performed by splitting time.

The details of the background, terminology, abbreviations, etc. used herein may be found in documents published before the present disclosure. For example, 3GPP TS 24 series, 3GPP TS 34 series, and 3GPP TS 38 series may be referenced (http://www.3gpp.org/specifications/specification-numbering).

Frame Structure

FIG. 1 is a diagram illustrating a frame structure in NR.

The NR system may support multiple numerologies. The numerology is defined by a subcarrier spacing and cyclic prefix (CP) overhead. A plurality of subcarrier spacings may be derived by scaling a basic subcarrier spacing by an integer N (or µ). The numerology may be selected independently of the frequency band of a cell although it is assumed that a small subcarrier spacing is not used at a high carrier frequency. In addition, the NR system may support various frame structures based on the multiple numerologies.

Hereinafter, an OFDM numerology and a frame structure, which may be considered in the NR system, will be described. Table 1 shows multiple OFDM numerologies supported in the NR system. The value of µ for a bandwidth part and a CP may be obtained by RRC parameters provided by the BS.

TABLE 1

| µ | $\Delta f = 2^\mu * 15$ [kHz] | Cyclic prefix(CP) |
|---|---|---|
| 0 | 15 | Normal |
| 1 | 30 | Normal |
| 2 | 60 | Normal, Extended |
| 3 | 120 | Normal |
| 4 | 240 | Normal |

The NR system supports multiple numerologies (e.g., subcarrier spacings) to support various 5G services. For example, the NR system supports a wide area in conventional cellular bands in a subcarrier spacing of 15 kHz and supports a dense urban environment, low latency, and wide carrier BW in a subcarrier spacing of 30/60 kHz. In a subcarrier spacing of 60 kHz or above, the NR system supports a BW higher than 24.25 GHz to overcome phase noise.

Resource Grid

Figure 2:
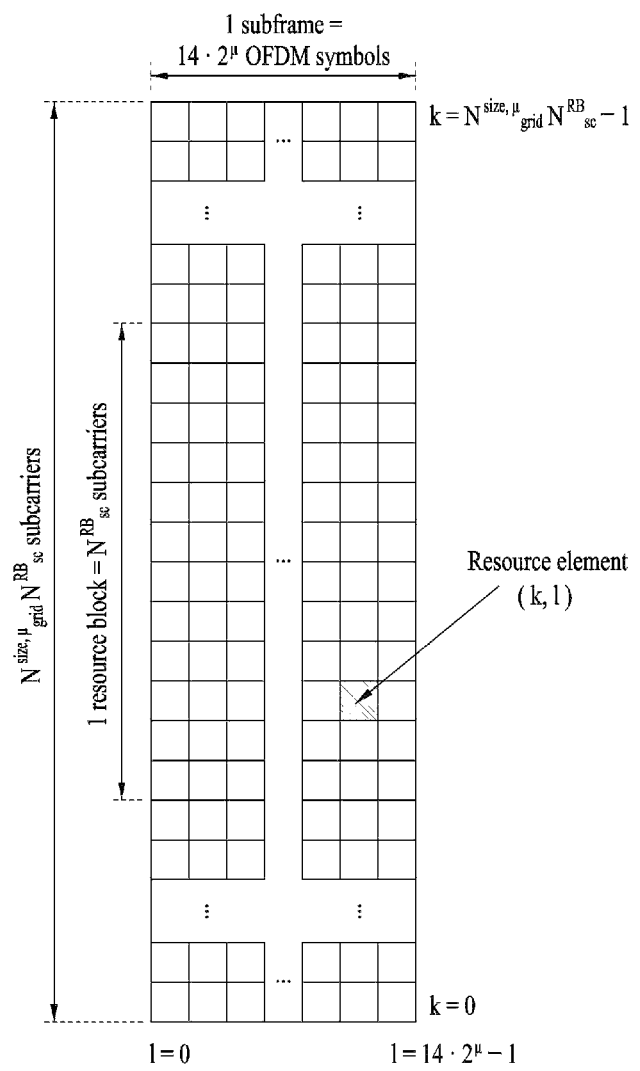
FIG. 2 illustrates a resource grid in NR.

FIG. 2 illustrates a resource grid in the NR.

Referring to FIG. 2, a resource grid consisting of Nsize,µgrid*NRBsc subcarriers and 14*2µ OFDM symbols may be defined for each subcarrier spacing configuration and carrier, where Nsize,µgrid is indicated by RRC signaling from the BS. Nsize,µgrid may vary not only depending on the subcarrier spacing configuration µ but also between UL and DL. One resource grid exists for the subcarrier spacing configuration μ, an antenna port p, and a transmission direction (i.e., UL or DL). Each element in the resource gird for the subcarrier spacing configuration μ and the antenna port p may be referred to as a resource element and identified uniquely by an index pair of (k, l), where k denotes an index in the frequency domain and l denotes the relative location of a symbol in the frequency domain with respect to a reference point. The resource element (k, l) for the subcarrier spacing configuration μ and the antenna port p may be a physical resource and a complex value, a(p,μ)k,l. A resource block (RB) is defined as NRBsc consecutive subcarriers in the frequency domain (where NRBsc=12).

Considering that the UE is incapable of supporting a wide BW supported in the NR system, the UE may be configured to operate in a part of the frequency BW of a cell (hereinafter referred to as a bandwidth part (BWP)).

Bandwidth Part (BWP)

The NR system may support up to 400 MHz for each carrier. If the UE always keeps a radio frequency (RF) module on for all carriers while operating on such a wideband carrier, the battery consumption of the UE may increase. Considering multiple use cases (e.g., eMBB, URLLC, mMTC, V2X, etc.) operating in one wideband carrier, a different numerology (e.g., subcarrier spacing) may be supported for each frequency band of the carrier. Further, considering that each UE may have a different capability regarding the maximum BW, the BS may instruct the UE to operate only in a partial BW rather than the whole BW of the wideband carrier. The partial bandwidth is referred to as the BWP. The BWP is a subset of contiguous common RBs defined for numerology pi in BWP i of the carrier in the frequency domain, and one numerology (e.g., subcarrier spacing, CP length, and/or slot/mini-slot duration) may be configured for the BWP.

The BS may configure one or more BWPs in one carrier configured for the UE. Alternatively, if UEs are concentrated in a specific BWP, the BS may move some UEs to another BWP for load balancing. For frequency-domain inter-cell interference cancellation between neighbor cells, the BS may configure BWPs on both sides of a cell except for some central spectra in the whole BW in the same slot. That is, the BS may configure at least one DL/UL BWP for the UE associated with the wideband carrier, activate at least one of DL/UL BWP(s) configured at a specific time (by L2 signaling which is a physical-layer control signal, a MAC control element (CE) which is a MAC-layer control signal, or RRC signaling), instruct the UE to switch to another configured DL/UL BWP (by L1 signaling, a MAC CE, or RRC signaling), or set a timer value and switch the UE to a predetermined DL/UL BWP upon expiration of the timer value. In particular, an activated DL/UL BWP is referred to as an active DL/UL BWP. While performing initial access or before setting up an RRC connection, the UE may not receive a DL/UL BWP configuration. A DL/UL BWP that the UE assumes in this situation is referred to as an initial active DL/UL BWP.

Synchronization Acquisition of Sidelink UE

In time division multiple access (TDMA) and frequency division multiple access (FDMA) systems, accurate time and frequency synchronization is essential. If time and frequency synchronization is not accurate, inter-symbol interference (ISI) and inter-carrier interference (ICI) may occur so that system performance may be degraded. This may occur in V2X. For time/frequency synchronization in V2X, a sidelink synchronization signal (SLSS) may be used in the physical layer, and master information block-sidelink-V2X (MIB-SL-V2X) may be used in the RLC layer.

Figure 3:
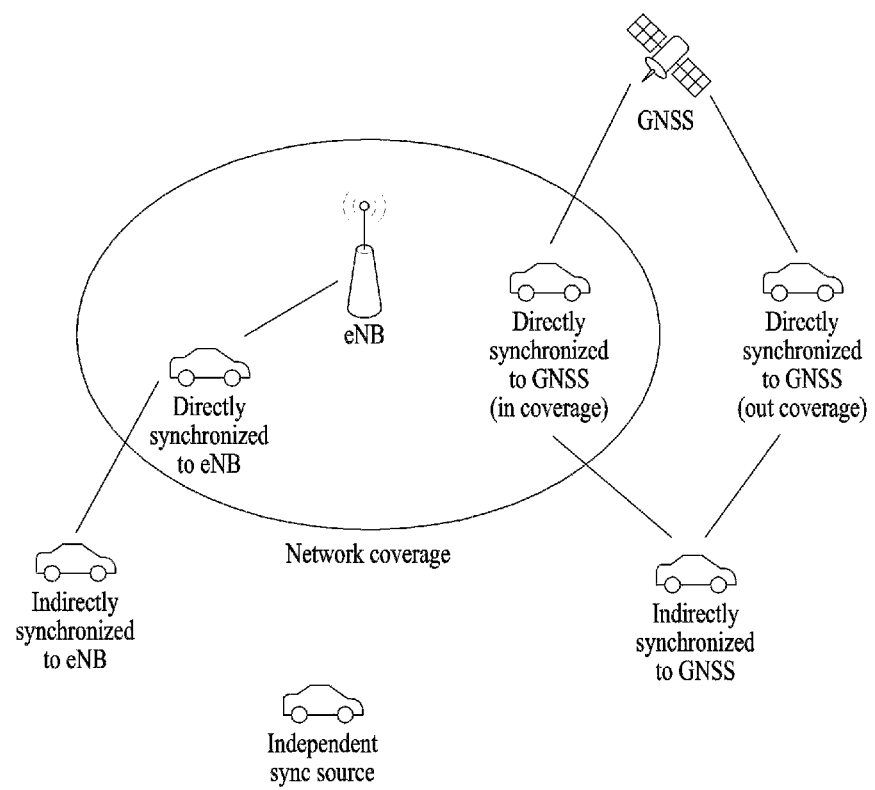
FIG. 3 illustrates sidelink synchronization.

FIG. 3 illustrates a synchronization source and a synchronization reference in V2X.

Referring to FIG. 3, in V2X, a UE may be directly synchronized to global navigation satellite systems (GNSS) or indirectly synchronized to the GNSS through another UE (in or out of the network coverage) that is directly synchronized to the GNSS. When the GNSS is set to the synchronization source, the UE may calculate a direct frame number (DFN) and a subframe number based on coordinated universal time (UTC) and a (pre)configured DFN offset.

Alternatively, the UE may be directly synchronized to the BS or synchronized to another UE that is time/frequency synchronized to the BS. For example, if the UE is in the coverage of the network, the UE may receive synchronization information provided by the BS and be directly synchronized to the BS. Thereafter, the UE may provide the synchronization information to another adjacent UE. If the timing of the BS is set to the synchronization reference, the UE may follow a cell associated with a corresponding frequency (if the UE is in the cell coverage at the corresponding frequency) or follow a PCell or serving cell (if the UE is out of the cell coverage at the corresponding frequency) for synchronization and DL measurement.

The serving cell (BS) may provide a synchronization configuration for carriers used in V2X sidelink communication. In this case, the UE may follow the synchronization configuration received from the BS. If the UE detects no cell from the carriers used in the V2X sidelink communication and receives no synchronization configuration from the serving cell, the UE may follow a predetermined synchronization configuration.

Alternatively, the UE may be synchronized to another UE that fails to directly or indirectly obtain the synchronization information from the BS or GNSS. The synchronization source and preference may be preconfigured for the UE or configured in a control message from the BS.

Hereinbelow, the SLSS and synchronization information will be described.

The SLSS may be a sidelink-specific sequence and include a primary sidelink synchronization signal (PSSS) and a secondary sidelink synchronization signal (SSSS).

Each SLSS may have a physical layer sidelink synchronization identity (ID), and the value may be, for example, any of 0 to 335. The synchronization source may be identified depending on which of the above values is used. For example, 0, 168, and 169 may indicate the GNSS, 1 to 167 may indicate the BS, and 170 to 335 may indicate out-of-coverage. Alternatively, among the values of the physical layer sidelink synchronization ID, 0 to 167 may be used by the network, and 168 to 335 may be used for the out-of-coverage state.

Figure 4:
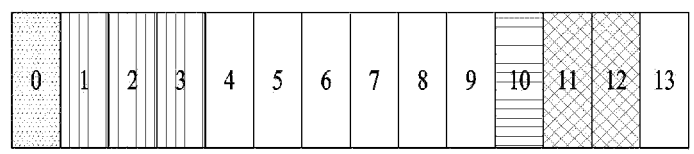
FIG. 4 illustrates a time resource unit for transmitting a sidelink synchronization signal.
Figure 4:
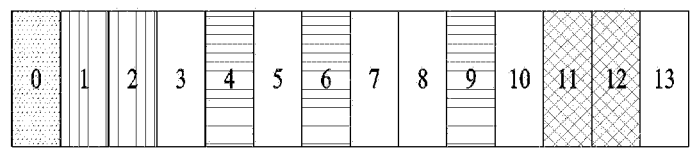
Figure 4:
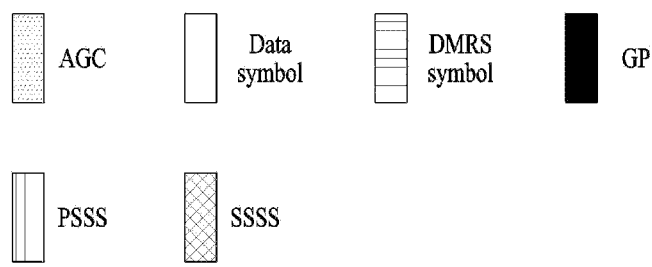

FIG. 4 illustrates a time resource unit for SLSS transmission. The time resource unit may be a subframe in LTE/LTE-A and a slot in 5G. The details may be found in 3GPP TS 36 series or 3GPP TS 28 series. A physical sidelink broadcast channel (PSBCH) may refer to a channel for carrying (broadcasting) basic (system) information that the UE needs to know before sidelink signal transmission and reception (e.g., SLSS-related information, a duplex mode (DM), a TDD UL/DL configuration, information about a resource pool, the type of an SLSS-related application, a subframe offset, broadcast information, etc.). The PSBCH and SLSS may be transmitted in the same time resource unit, or the PSBCH may be transmitted in a time resource unit after that in which the SLSS is transmitted. A DMRS may be used to demodulate the PSBCH.

Sidelink Transmission Mode

For sidelink communication, transmission modes 1, 2, 3 and 4 are used.

In transmission mode 1/3, the BS performs resource scheduling for UE 1 over a PDCCH (more specifically, DCI) and UE 1 performs D2D/V2X communication with UE 2 according to the corresponding resource scheduling. After transmitting sidelink control information (SCI) to UE 2 over a physical sidelink control channel (PSCCH), UE 1 may transmit data based on the SCI over a physical sidelink shared channel (PSSCH). Transmission modes 1 and 3 may be applied to D2D and V2X, respectively.

Transmission mode 2/4 may be a mode in which the UE performs autonomous scheduling (self-scheduling). Specifically, transmission mode 2 is applied to D2D. The UE may perform D2D operation by autonomously selecting a resource from a configured resource pool. Transmission mode 4 is applied to V2X. The UE may perform V2X operation by autonomously selecting a resource from a selection window through a sensing process. After transmitting the SCI to UE 2 over the PSCCH, UE 1 may transmit data based on the SCI over the PSSCH. Hereinafter, the term 'transmission mode' may be simply referred to as 'mode'.

Control information transmitted by a BS to a UE over a PDCCH may be referred to as DCI, whereas control information transmitted by a UE to another UE over a PSCCH may be referred to as SCI. The SCI may carry sidelink scheduling information. The SCI may have several formats, for example, SCI format 0 and SCI format 1.

SCI format 0 may be used for scheduling the PSSCH. SCI format 0 may include a frequency hopping flag (1 bit), a resource block allocation and hopping resource allocation field (the number of bits may vary depending on the number of sidelink RBs), a time resource pattern (7 bits), a modulation and coding scheme (MCS) (5 bits), a time advance indication (11 bits), a group destination ID (8 bits), etc.

SCI format 1 may be used for scheduling the PSSCH. SCI format 1 may include a priority (3 bits), a resource reservation (4 bits), the location of frequency resources for initial transmission and retransmission (the number of bits may vary depending on the number of sidelink subchannels), a time gap between initial transmission and retransmission (4 bits), an MCS (5 bits), a retransmission index (1 bit), a reserved information bit, etc. Hereinbelow, the term 'reserved information bit' may be simply referred to as a 'reserved bit'. The reserved bit may be added until the bit size of SCI format 1 becomes 32 bits.

SCI format 0 may be used for transmission modes 1 and 2, and SCI format 1 may be used for transmission modes 3 and 4.

Sidelink Resource Pool

Figure 5:
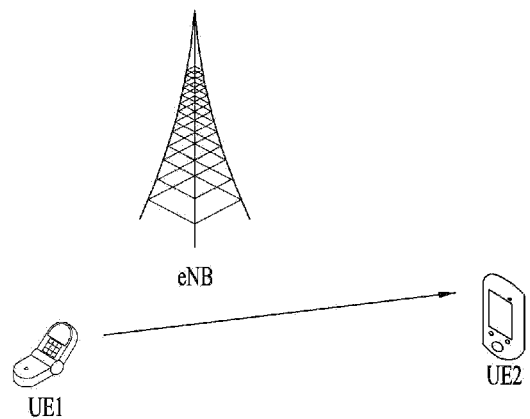
FIG. 5 illustrates a sidelink resource pool.
Figure 5:
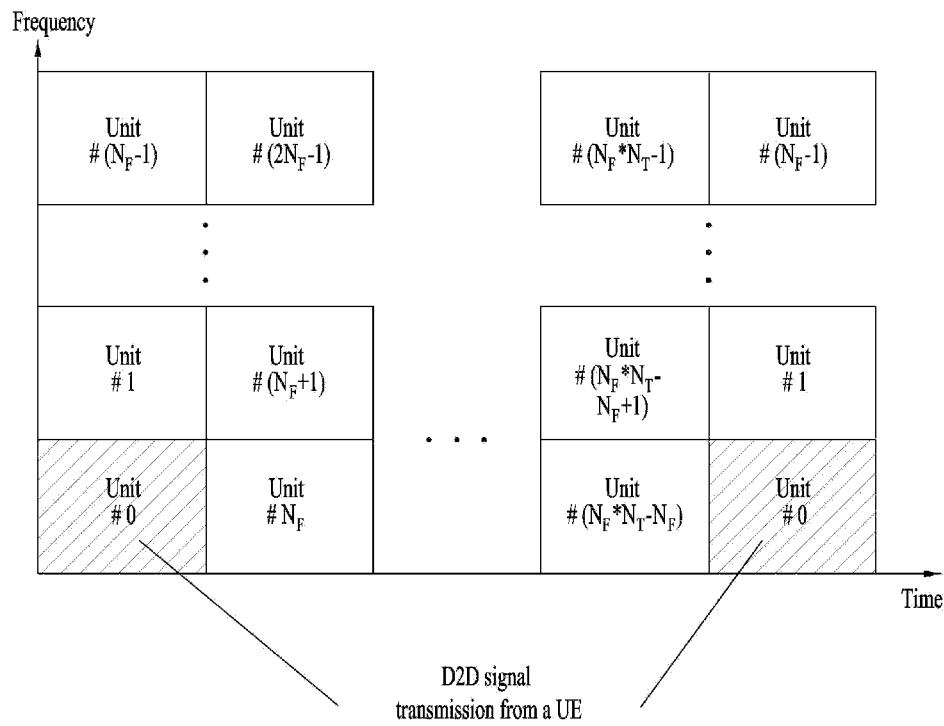

FIG. 5 shows an example of a first UE (UE1), a second UE (UE2) and a resource pool used by UE1 and UE2 performing sidelink communication.

Figure 8:
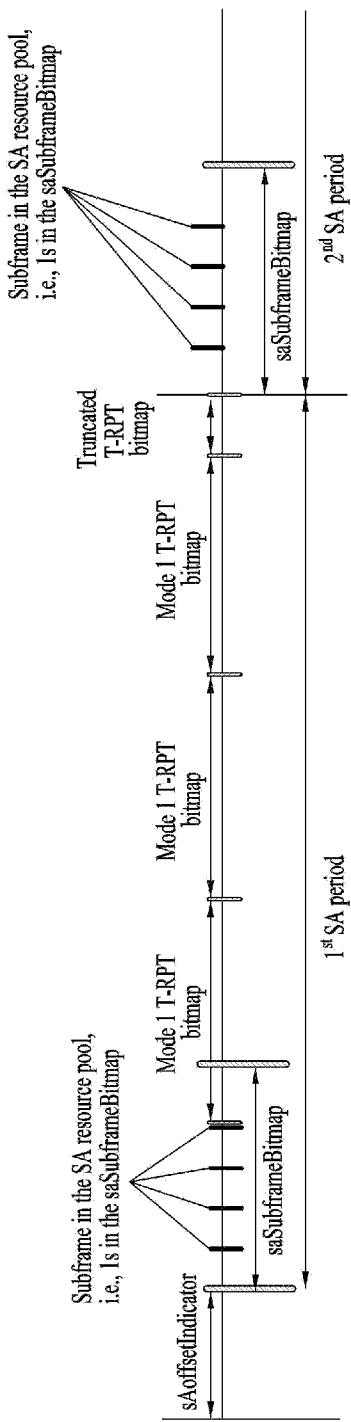
FIG. 8 illustrates transmission of a physical sidelink control channel (PSCCH).

In FIG. 5(*a*), a UE corresponds to a terminal or such a network device as a BS transmitting and receiving a signal according to a sidelink communication scheme. A UE selects a resource unit corresponding to a specific resource from a resource pool corresponding to a set of resources and the UE transmits a sidelink signal using the selected resource unit. UE2 corresponding to a receiving UE receives a configuration of a resource pool in which UE1 is able to transmit a signal and detects a signal of UE1 in the resource pool. In this case, if UE1 is located in the coverage of a BS, the BS may inform UE1 of the resource pool. If UE1 is located out of the coverage of the BS, the resource pool may be informed by a different UE or may be determined by a predetermined resource. In general, a resource pool includes a plurality of resource units. A UE selects one or more resource units from among a plurality of the resource units and may be able to use the selected resource unit(s) for sidelink signal transmission. FIG. 5(*b*) shows an example of configuring a resource unit. Referring to FIG. 8(*b*), the entire frequency resources are divided into the NF number of resource units and the entire time resources are divided into the NT number of resource units. In particular, it is able to define NF*NT number of resource units in total. In particular, a resource pool may be repeated with a period of NT subframes. Specifically, as shown in FIG. 8, one resource unit may periodically and repeatedly appear. Alternatively, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a sidelink signal.

A resource pool may be classified into various types. First of all, the resource pool may be classified according to contents of a sidelink signal transmitted via each resource pool. For example, the contents of the sidelink signal may be classified into various signals and a separate resource pool may be configured according to each of the contents. The contents of the sidelink signal may include a scheduling assignment (SA or physical sidelink control channel (PSCCH)), a sidelink data channel, and a discovery channel. The SA may correspond to a signal including information on a resource position of a sidelink data channel, information on a modulation and coding scheme (MCS) necessary for modulating and demodulating a data channel, information on a MIMO transmission scheme, information on a timing advance (TA), and the like. The SA signal may be transmitted on an identical resource unit in a manner of being multiplexed with sidelink data. In this case, an SA resource pool may correspond to a pool of resources that an SA and sidelink data are transmitted in a manner of being multiplexed. The SA signal may also be referred to as a sidelink control channel or a physical sidelink control channel (PSCCH). The sidelink data channel (or, physical sidelink shared channel (PSSCH)) corresponds to a resource pool used by a transmitting UE to transmit user data. If an SA and a sidelink data are transmitted in a manner of being multiplexed in an identical resource unit, sidelink data channel except SA information may be transmitted only in a resource pool for the sidelink data channel In other word, REs, which are used to transmit SA information in a specific resource unit of an SA resource pool, may also be used for transmitting sidelink data in a sidelink data channel resource pool. The discovery channel may correspond to a resource pool for a message that enables a neighboring UE to discover transmitting UE transmitting information such as ID of the UE, and the like.

Despite the same contents, sidelink signals may use different resource pools according to the transmission and reception properties of the sidelink signals. For example, despite the same sidelink data channels or the same discovery messages, they may be distinguished by different resource pools according to transmission timing determination schemes for the sidelink signals (e.g., whether a sidelink signal is transmitted at the reception time of a synchronization reference signal or at a time resulting from applying a predetermined TA to the reception time of the synchronization reference signal), resource allocation schemes for the sidelink signals (e.g., whether a BS configures the transmission resources of an individual signal for an individual transmitting UE or the individual transmitting UE autonomously selects the transmission resources of an individual signal in a pool), the signal formats of the sidelink signals (e.g., the number of symbols occupied by each sidelink signal in one subframe or the number of subframes used for transmission of a sidelink signal), signal strengths from the BS, the transmission power of a sidelink UE, and so on. In sidelink communication, a mode in which a BS directly indicates transmission resources to a sidelink transmitting UE is referred to as sidelink transmission mode 1, and a mode in which a transmission resource area is preconfigured or the BS configures a transmission resource area and the UE directly selects transmission resources is referred to as sidelink transmission mode 2. In sidelink discovery, a mode in which a BS directly indicates resources is referred to as Type 2, and a mode in which a UE selects transmission resources directly from a preconfigured resource area or a resource area indicated by the BS is referred to as Type 1.

In V2X, sidelink transmission mode 3 based on centralized scheduling and sidelink transmission mode 4 based on distributed scheduling are available.

Figure 6:
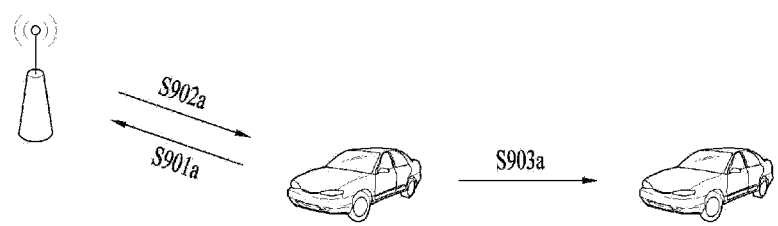
FIG. 6 illustrates scheduling schemes based on sidelink transmission modes.
Figure 6:
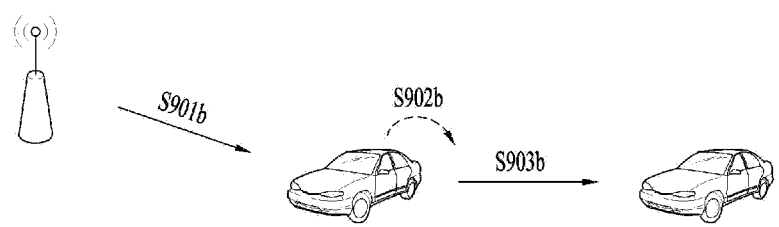

FIG. 6 illustrates scheduling schemes based on these two transmission modes. Referring to FIG. 6, in transmission mode 3 based on centralized scheduling of FIG. 6(a), a vehicle requests sidelink resources to a BS (S901a), and the BS allocates the resources (S902a). Then, the vehicle transmits a signal on the resources to another vehicle (S903a). In the centralized transmission, resources on another carrier may also be scheduled. In transmission mode 4 based on distributed scheduling of FIG. 6(b), a vehicle selects transmission resources (S902b) by sensing a resource pool, which is preconfigured by a BS (S901b). Then, the vehicle may transmit a signal on the selected resources to another vehicle (S903b).

Figure 7:
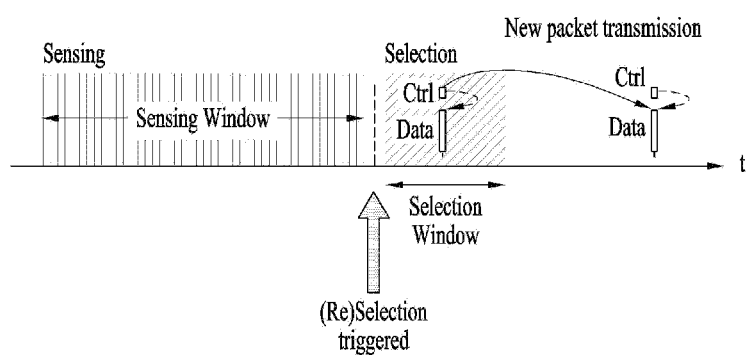
FIG. 7 illustrates selection of sidelink transmission resources.

When the transmission resources are selected, transmission resources for a next packet are also reserved as illustrated in FIG. 7. In V2X, transmission is performed twice for each MAC PDU. When resources for initial transmission are selected, resources for retransmission are also reserved with a predetermined time gap from the resources for the initial transmission. The UE may identify transmission resources reserved or used by other UEs through sensing in a sensing window, exclude the transmission resources from a selection window, and randomly select resources with less interference from among the remaining resources.

For example, the UE may decode a PSCCH including information about the cycle of reserved resources within the sensing window and measure PSSCH RSRP on periodic resources determined based on the PSCCH. The UE may exclude resources with PSCCH RSRP more than a threshold from the selection window. Thereafter, the UE may randomly select sidelink resources from the remaining resources in the selection window.

Alternatively, the UE may measure received signal strength indication (RSSI) for the periodic resources in the sensing window and identify resources with less interference, for example, the bottom 20 percent. After selecting resources included in the selection window from among the periodic resources, the UE may randomly select sidelink resources from among the resources included in the selection window. For example, when PSCCH decoding fails, the above method may be applied.

The details thereof may be found in clause 14 of 3GPP TS 3GPP TS 36.213 V14.6.0, which are incorporated herein by reference.

Transmission and Reception of PSCCH

In sidelink transmission mode 1, a UE may transmit a PSCCH (sidelink control signal, SCI, etc.) on a resource configured by a BS. In sidelink transmission mode 2, the BS may configure resources used for sidelink transmission for the UE, and the UE may transmit the PSCCH by selecting a time-frequency resource from among the configured resources.

FIG. 8 shows a PSCCH period defined for sidelink transmission mode 1 or 2.

Referring to FIG. 8, a first PSCCH (or SA) period may start in a time resource unit apart by a predetermined offset from a specific system frame, where the predetermined offset is indicated by higher layer signaling. Each PSCCH period may include a PSCCH resource pool and a time resource unit pool for sidelink data transmission. The PSCCH resource pool may include the first time resource unit in the PSCCH period to the last time resource unit among time resource units indicated as carrying a PSCCH by a time resource unit bitmap. In mode 1, since a time-resource pattern for transmission (T-RPT) or a time-resource pattern (TRP) is applied, the resource pool for sidelink data transmission may include time resource units used for actual transmission. As shown in the drawing, when the number of time resource units included in the PSCCH period except for the PSCCH resource pool is more than the number of T-RPT bits, the T-RPT may be applied repeatedly, and the last applied T-RPT may be truncated as many as the number of remaining time resource units. A transmitting UE performs transmission at a T-RPT position of 1 in a T-RPT bitmap, and transmission is performed four times in one MAC PDU.

Figure 9:
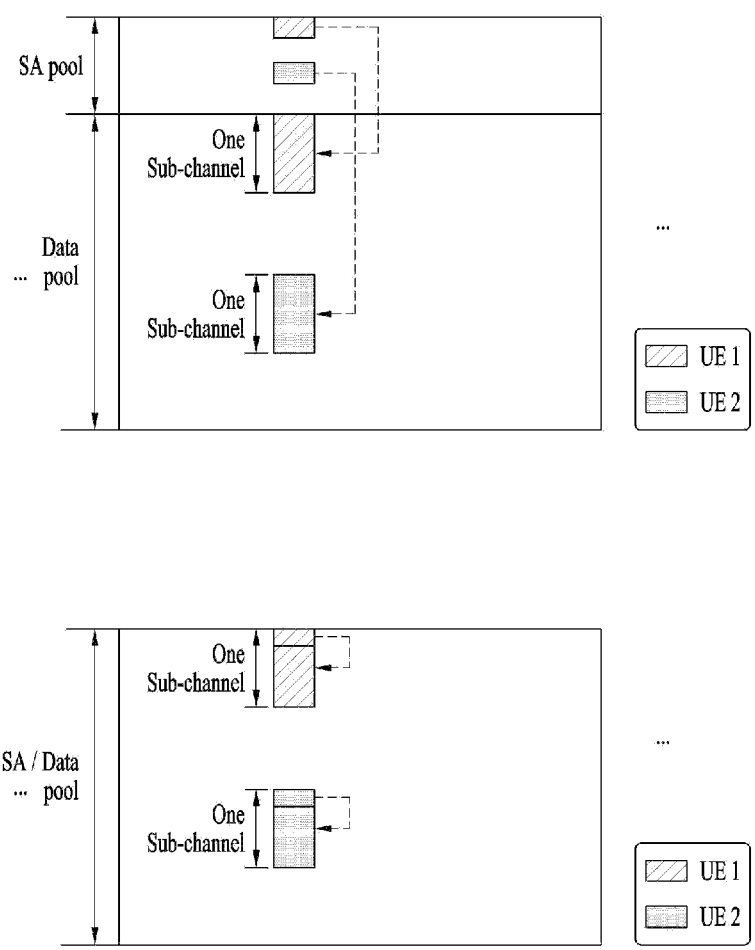
FIG. 9 illustrates PSCCH transmission in sidelink vehicle-to-everything (V2X) communication.

In V2X, that is, sidelink transmission mode 3 or 4, a PSCCH and data (PSSCH) are frequency division multiplexed (FDM) and transmitted, unlike sidelink communication. Since latency reduction is important in V2X in consideration of the nature of vehicle communication, the PSCCH and data are FDM and transmitted on the same time resources but different frequency resources. FIG. 9 illustrates examples of this transmission scheme. The PSCCH and data may not be contiguous to each other as illustrated in FIG. 9(a) or may be contiguous to each other as illustrated in FIG. 9(b). A subchannel is used as the basic unit for the transmission. The subchannel is a resource unit including one or more RBs in the frequency domain within a predetermined time resource (e.g., time resource unit). The number of RBs included in the subchannel, i.e., the size of the subchannel and the starting position of the subchannel in the frequency domain are indicated by higher layer signaling.

For V2V communication, a periodic type of cooperative awareness message (CAM) and an event-triggered type of decentralized environmental notification message (DENM) may be used. The CAM may include dynamic state information of a vehicle such as direction and speed, vehicle static data such as dimensions, and basic vehicle information such as ambient illumination states, path details, etc. The CAM may be 50 to 300 bytes long. In addition, the CAM is broadcast, and its latency should be less than 100 ms. The DENM may be generated upon occurrence of an unexpected incident such as a breakdown, an accident, etc. The DENM may be shorter than 3000 bytes, and it may be received by all vehicles within the transmission range. The DENM may have priority over the CAM. When it is said that messages are prioritized, it may mean that from the perspective of a UE, if there are a plurality of messages to be transmitted at the same time, a message with the highest priority is preferentially transmitted, or among the plurality of messages, the message with highest priority is transmitted earlier in time than other messages. From the perspective of multiple UEs, a high-priority message may be regarded to be less vulnerable to interference than a low-priority message, thereby reducing the probability of reception error. If security overhead is included in the CAM, the CAM may have a large message size compared to when there is no security overhead.

Sidelink Congestion Control

A sidelink radio communication environment may easily become congested according to increases in the density of vehicles, the amount of information transfer, etc. Various methods are applicable for congestion reduction. For example, distributed congestion control may be applied.

In the distributed congestion control, a UE understands the congestion level of a network and performs transmission control. In this case, the congestion control needs to be performed in consideration of the priorities of traffic (e.g., packets).

Specifically, each UE may measure a channel busy ratio (CBR) and then determine the maximum value (CRlimitk) of a channel occupancy ratio (CRk) that can be occupied by each traffic priority (e.g., k) according to the CBR. For example, the UE may calculate the maximum value (CRlimitk) of the channel occupancy ratio for each traffic priority based on CBR measurement values and a predetermined table. If traffic has a higher priority, the maximum value of the channel occupancy ratio may increase.

The UE may perform the congestion control as follows. The UE may limit the sum of the channel occupancy ratios of traffic with a priority k such that the sum does not exceed a predetermined value, where k is less than i. According to this method, the channel occupancy ratios of traffic with low priorities are further restricted.

Besides, the UE may use methods such as control of the magnitude of transmission power, packet drop, determination of retransmission or non-retransmission, and control of the size of a transmission RB (MCS adjustment).

5G Use Cases

Three key requirement areas of 5G (e.g., NR) include (1) enhanced mobile broadband (eMBB), (2) massive machine type communication (mMTC), and (3) ultra-reliable and low latency communications (URLLC).

Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is augmented reality (AR) for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple 5G use cases will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G.

Finally, logistics and freight tracking are important use cases for mobile communications that enable the tracking of inventory and packages wherever they are by using location-based information systems. The logistics and freight tracking use cases typically require lower data rates but need wide coverage and reliable location information.

Next-generation communication systems may support various use cases, for example, communication services for autonomous driving vehicles, smart cars, or connected cars. For these services, each vehicle may exchange information as a communication-capable UE. Specifically, depending on situations, each vehicle may be assisted by a BS or select resources for communication and then exchange messages with another UE with no assistance from the BS. The details and/or embodiments of the present disclosure may be considered as one proposed method, and any combination of details and/or embodiments may also be considered as a new proposed method. In addition, it is apparent that the details shall not be limited only to an embodiment of the present disclosure nor be limited only to a specific system. All parameters, all operations, any combination of parameters and/or operations, the application of a specific parameter and/or operation, and/or the application of any combination of parameters and/or operations may be configured (or preconfigured) by the BS for the UE through higher layer signaling and/or physical layer signaling or may be predefined in the system. Additionally, each detail of the present disclosure may be defined as one operation mode, and the BS may configure (or preconfigure) the operation mode for the UE through higher layer signaling and/or physical layer signaling to enable the UE to operate in the corresponding operation mode. In this document, a transmission time interval (TTI) may correspond to various length units such as a sub-slot/slot/subframe, a basic transmission unit, and so on. The UE may correspond to various types of devices such as a vehicle, a pedestrian UE, and so on.

Embodiment

The present disclosure proposes a method of preventing resource fragmentation. Specifically, the present disclosure proposes a method of preventing and/or mitigating resource fragmentation, i.e., a phenomenon that transmission of a large packet is disturbed when a specific UE partially occupies resource(s) in a scheduling mode in which UEs autonomously select resources for direct communication therebetween.

In a mode where UEs autonomously select resources for direct communication therebetween, i.e., device-to-device (D2D) communication (e.g., sidelink transmission mode 2, sidelink transmission mode 4, distributed scheduling mode, etc.), the resource fragmentation may occur. The resource fragmentation may mean a phenomenon that a UE transmitting a small packet occupies several resources indiscreetly so that a UE intending to transmit a large packet fails to occupy contiguous resources therefor. In particular, in-band emission (IBE) may occur in D2D communication due to non-linearity in the RF circuit of the UE. Thus, to prevent the occurrence of the IBE, the UE may need to select contiguous resources in the frequency domain when selecting radio resources. Further, if the UE selects contiguous resources in the frequency domain, the number of bits required for resource allocation may be reduced as well. When a channel is transmitted on a frequency resource, a weak noise signal may be transmitted on other frequency resources except the frequency resource. This is called in-band transmission power.

As described above, the resource fragmentation may occur in the mode where UEs select contiguous resources in the frequency domain for D2D communication and autonomously select time frequency resources. As a result, a UE having a large packet to transmit may fail to select a transmission resource because there are no contiguous resources in the frequency domain even though the absolute amount of radio resources is sufficient.

The UE may autonomously select contiguous resources in the frequency domain. The UE may select the resources according to sensing results, select the resources in a random manner, or select the resources based on other mechanisms. The other mechanisms may include a method by which another UE (e.g., a road side unit (RSU)) indicates the resources or a method by which a receiving UE indicates candidate resources.

The UE may select a transmission resource on a continuous frequency resource group basis. In this case, a continuous frequency resource group is referred to as a subchannel That is, the UE may select the transmission resource on a subchannel basis. When a plurality of subchannels are selected, contiguous subchannels may be selected. In another example, when one subchannel is mapped to physical frequency resources, one logical subchannel or a plurality of subchannels may be mapped to non-contiguous frequency resources.

When the UE autonomously selects a transmission resource, the UE may signal the selected transmission resource to a neighboring UE in a control signal. The neighboring UE may recognize which frequency resources other UEs use by decoding control signals.

Figure 10:
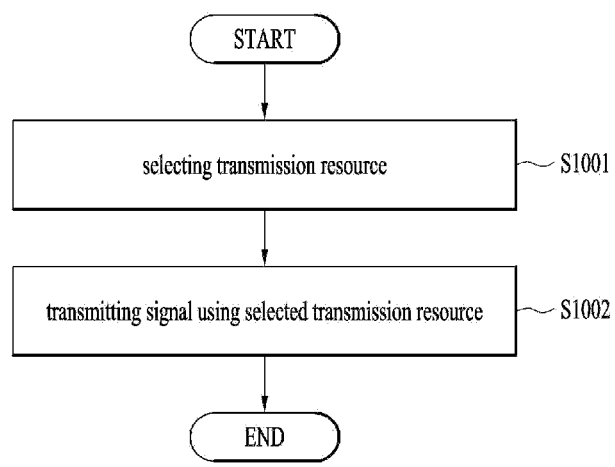
FIG. 10 is a flowchart illustrating operations of a method according to the embodiments of the present disclosure.

FIG. 10 is a flowchart illustrating an embodiment of the present disclosure.

The amount of frequency resources available for each subchannel may be limited. The network (e.g., BS, eNB, gNB, etc.). The network may transmit the size of a packet available for each subchannel, the size of a subchannel, the range of packet sizes, and/or the range of subchannel sizes to the UE through physical layer signaling or higher layer signaling. When the UE is out of the coverage of the network (e.g., out-of-coverage UE), the above-described parameters may be predefined. For example, when the UE uses a subchannel with a specific size, if the index of the subchannel is more than or equal to a first threshold and less than a second threshold, the UE may be configured not to use the corresponding subchannel to prevent the resource fragmentation. The amount of frequency resources that can be allocated for each subchannel may be limited. For example, it is assumed that there are 6 subchannels and the 6 subchannels are indexed from 0 to 5 in the frequency domain. In this case, if the UE uses only one subchannel, the UE may not use subchannel indices #3 and #4.

Referring to FIG. 10, a method of transmitting a signal by a UE in a wireless communication system according to an embodiment of the present disclosure may include: selecting, by the UE, a transmission resource (S1001); and transmitting, by the UE, the signal on the selected transmission resource to another UE (S1002). The transmission resource may include a first transmission resource region for transmitting a first signal and a second transmission resource region for transmitting a second signal, wherein the second transmission resource region may be greater than the first transmission resource region. The first and second transmission resource regions may be mapped to different subchannel indices, and the first transmission resource region may be allocated to the edges of a frequency region for transmitting the first and second signals. The first signal may be a narrowband signal, and the second signal may be a wideband signal.

The first transmission resource region may be mapped to a subchannel index greater than a first threshold or smaller than a second threshold, and the second transmission resource region may be mapped to a subchannel index smaller than or equal to the first threshold and greater than or equal to the second threshold. The first threshold is greater than the second threshold.

Regarding that the first transmission resource region is allocated to the edges of the frequency region for transmitting the first and second signals, the first transmission resource region may be mapped to a minimum subchannel index and a maximum subchannel index, and the second transmission resource region may be mapped to a subchannel index except the minimum and maximum subchannel indices. For example, the first and last indices among allocated subchannel indices may be regarded as resource edges. Thus, narrowband transmission may be performed only on resources corresponding to the first and last indices, and wideband transmission may be performed between the first and last indices (or between the second and second last indices). For example, when subchannel indices #0 to #5 are allocated, the narrowband transmission may be performed only in subchannel indices #0 and #5, and the wideband transmission may be performed in subchannel indices #0 to #5 (or subchannel indices #1 to #4). The narrowband transmission may be allowed in some edge resources among sidelink frequency resources, and the wideband transmission may be allowed in all subchannels. As another method, the wideband transmission may be allowed when the subchannel index is low, and the narrowband transmission may be allowed when the subchannel index is more than or equal to a predetermined threshold. That is, a resource region for the wideband transmission may be differentiated from a resource region for the narrowband transmission. Accordingly, the present disclosure has technical effects in that it provides a wireless communication system where a UE configured with wideband transmission easily secures a transmission resource by preventing other UEs from selecting resources indiscreetly.

Figure 11:
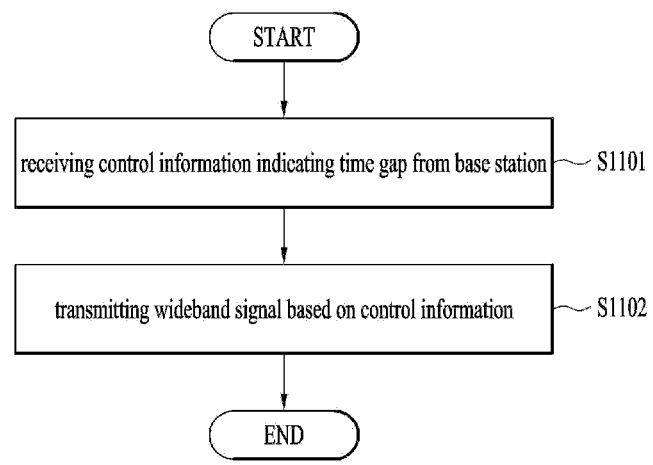
FIG. 11 is a flowchart illustrating operations of a method according to the embodiments of the present disclosure.

When wideband transmission (for which the subchannel size is greater than or equal to a predetermined value) is indicated by a specific UE, a narrowband transmission UE that uses (reserves) a region overlapping with the indicated wideband transmission may i) drop narrowband transmission or ii) reselect a resource for the narrowband transmission and then perform the narrowband transmission on the reselected resource. To this end, a UE transmitting a packet having a predetermined size or more (e.g., wideband transmission UE) may configure a time gap with a predetermined length between control signal transmission and data signal transmission. In this case, a UE that applies the configured time gap may transmit a control signal before a data signal. That is, for a case in which the size of a transmitted packet is more than or equal to a predetermined threshold or the size of a frequency resource for signal transmission (e.g., subchannel) is more than or equal to a predetermined threshold, the time gap between control and data signals may be preconfigured, or the network (e.g., BS, eNB, gNB, etc.) may indicate information about the time gap to the UE through physical layer signaling and/or higher layer signaling. Referring to FIG. 11, an embodiment of the present disclosure may include: receiving, by a transmitting UE, control information indicating a time gap from a BS (S1101); and transmitting, by the transmitting UE to another UE, a wideband signal to which the time gap indicated by the received control information is applied (S1102).

In this case, the information about the time gap may include the time gap between control and data signals configured for each packet size (or range) or for each subchannel size (or range). For out-of-network coverage UEs, the time gap may be predetermined. A wideband transmission UE may perform transmission by applying the time gap between the PSCCH and PSSCH so that a narrowband transmission UE may efficiently detect (check) that narrowband transmission overlaps with wideband transmission. According to this method, resources may be selected more flexibly compared to other proposed methods.

Time and frequency resources may divided into a plurality of resource regions, and the size of a subchannel available for each resource region may be limited. In this method, resource regions are semi-persistently divided depending on the size of a packet to be transmitted. For example, sidelink frequency resources may be divided into a plurality of resource regions, and the size of a subchannel available for each resource region may be limited. In this case, a resource region for narrowband transmission may be configured at the edges of the sidelink frequency resources, and a resource region for wideband transmission may be configured at the center of the sidelink frequency resources. Here, if the size of resources for a packet (or for transmitting the packet) (e.g., subchannel) is less than a prescribed threshold, it may be regarded as narrowband transmission. If the size of resources for a packet (or for transmitting the packet) (e.g., subchannel) is more than or equal to the prescribed threshold, it may be regarded as wideband transmission. For example, referring to the signal transmission of S1002 of FIG. 10, if the size of the resource for transmitting the signal is more than or equal to a third threshold, the signal may be transmitted as the second signal in the second resource region. If the size of the resource for transmitting the signal is less than the third threshold, the signal may be transmitted as the first signal in the first resource region.

The above method may reduce the sensing complexity of the UE by dividing resource regions. However, if there is no packet with a specific size, some resources may be wasted because resources are divided semi-persistently. To prevent the resource waste, the network (e.g., BS, eNB, gNB, etc.) may configure a specific resource region such that it overlaps with another resource region. For example, wideband signal transmission and/or narrowband signal transmission may be performed selectively (transmitted or dropped) in the overlapping resource region by detecting whether there is a UE employing the specific resource region and/or whether the specific resource region is used. In another example, resource reselection for the wideband signal transmission and/or narrowband signal transmission may be performed based on whether there is a UE employing the specific resource region and/or whether the specific resource region is used.

The above descriptions are summarized as follows.

Method 1) The amount of frequency resources available for each subchannel may be limited. In this case, the network may signal the size of a packet available for each subchannel, the size of a subchannel, the range of packet sizes, and/or the range of subchannel sizes through physical layer signaling or higher layer signaling. For an out-of-coverage UE (when the UE is out of the coverage of the network), these parameters may be predefined. For example, when the UE uses a subchannel with a specific size, if the index of the subchannel is more than or equal to a first threshold and less than a second threshold, the UE may be configured not to use the corresponding subchannel to prevent the resource fragmentation. In other words, the amount of frequency resources that can be allocated for each subchannel may be limited. For example, it is assumed that there are 6 subchannels and the 6 subchannels are indexed from 0 to 5 in the frequency domain. In this case, if the UE uses only one subchannel, the UE may not use subchannel indices #3 and #4. According to this method, the following operation may be implemented. For example, narrowband transmission may be allowed in some edge resources among sidelink frequency resources, and wideband transmission may be allowed in all subchannels. As another method, wideband transmission may be allowed when the subchannel index is low, and the narrowband transmission may be allowed when the subchannel index is more than or equal to a predetermined threshold. According to this method, when the UE is configured with wideband transmission, the UE may easily secures a transmission resource because other UEs are prohibited from selecting resources indiscreetly.

Method 2) When wideband transmission (for which the subchannel size is greater than or equal to a predetermined value) is indicated by a specific UE, a narrowband transmission UE that uses/reserves a region overlapping with the corresponding wideband transmission may drop transmission or perform resource reselection. To this end, a UE transmitting a packet having a predetermined size or more may configure a time gap with a predetermined length between control and data signals and then transmit the control signal first. That is, when the size of a packet is more than or equal to a predetermined threshold or the size of a subchannel is more than or equal to a predetermined threshold, the time gap between control and data signals may be preconfigured. Alternatively, the network may indicate the time gap between control and data signals for each packet size (or range) or for each subchannel size (or range) through physical layer signaling and/or higher layer signaling. This value may be predetermined when the UE is out of the network coverage. According to this method, resources may be selected more flexibly compared to other proposed methods.

Method 3) Time and frequency resources may divided into a plurality of resource regions, and the size of a subchannel available for each resource region may be limited. In this method, resource regions are semi-persistently divided depending on the size of a packet to be transmitted. For example, sidelink frequency resources may be divided into a plurality of resource regions, and the size of a subchannel available for each resource region may be limited. In this case, a resource region for narrowband transmission may be configured close to the edges of the sidelink frequency resources (when the subchannel size is less than a predetermined threshold or when the packet size is less than a predetermined threshold), and a resource region for wideband transmission may be configured close to the center of the sidelink frequency resources. This method may reduce the sensing complexity of the UE by dividing resource regions. However, if there is no packet with a specific size, some resources may be wasted because resources are divided semi-persistently. To prevent the resource waste, the network may configure a specific resource region such that it overlaps with another resource region. In this case, wideband signal transmission and/or narrowband signal transmission may be performed selectively (transmitted or dropped) in the overlapping resource region by detecting whether there is a UE employing the specific resource region and/or whether the specific resource region is used. In another example, resource reselection for the wideband signal transmission and/or narrowband signal transmission may be performed based on whether there is a UE employing the specific resource region and/or whether the specific resource region is used.

Example of Communication System to which the Present Disclosure is Applied

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

Figure 12:
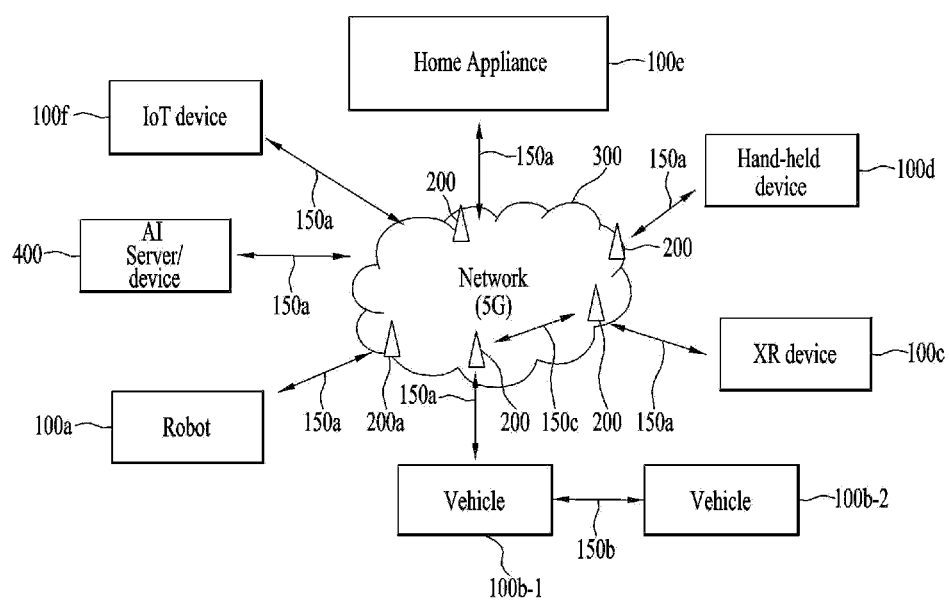
FIG. 12 is a diagram showing a communication system to which one embodiment of the present disclosure is applied.

FIG. 12 illustrates a communication system 1 applied to the present disclosure. Referring to FIG. 12, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smart pad, a wearable device (e.g., a smart watch or smart glasses), and a computer (e.g., a laptop). The home appliance may include a TV, a refrigerator, a washing machine, and so on. The IoT device may include a sensor, a smart meter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g. relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Example of Wireless Device to which the Present Disclosure is Applied

Figure 13:
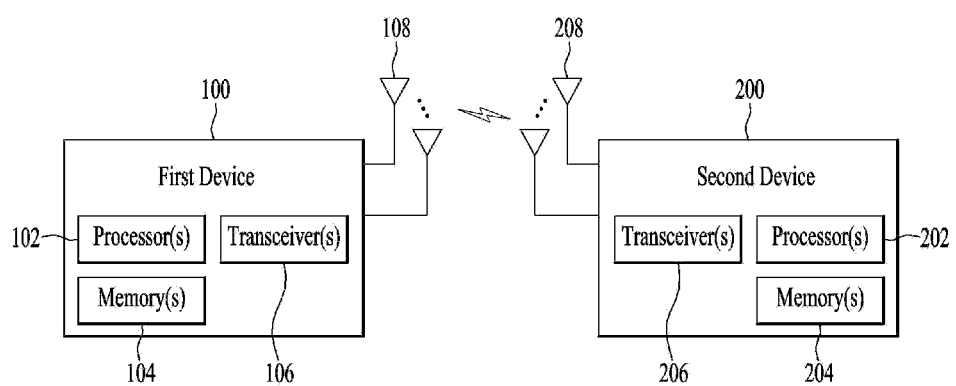
FIG. 13 is a block diagram showing a wireless device to which one embodiment of the present disclosure is applicable.

FIG. 13 illustrates wireless devices applicable to the present disclosure.

Referring to FIG. 13, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 12.

The first wireless device 100 includes one or more processors 102 and one or more memories 104, and may further include one or more transceivers 106 and/or one or more antennas 108. The processor 102 may be configured to control the memory 104 and/or the transceiver 106 to implement the descriptions, functions, procedures, proposals, methods and/or operation flowcharts disclosed in the present document. For example, the processor 102 may be configured to implement at least one operation for the methods described above in relation to FIG. 10 or FIG. 11. For example, the processor 102 may be configured to select a transmission resource and control the transceiver 106 and/or antenna 108 to transmit a signal on the selected transmission resource to another UE. The transmission resource may include a first transmission resource region for transmission of a first signal and a second transmission resource region for transmission of a second signal, wherein the second transmission resource region is greater than the first transmission resource region. The first and second transmission resource regions may be mapped to different subchannel indices. The first transmission resource region may be allocated to the edges of a frequency region for transmitting the first and second signals.

In addition, the processor 102 may generate a first information/signal by processing information within the memory 104 and then transmit a wireless signal including the first information/signal through the transceiver 106. In addition, the processor 102 may receive a wireless signal including a second information/signal through the transceiver 106 and then save information obtained from the signal processing of the second information/signal to the memory 104. The memory 104 may be connected to the processor 102 and store various information related to operations of the processor 102. For example, the memory 104 may store software codes including commands for performing some or all of the processes controlled by the processor 102 or executing the descriptions, functions, procedures, methods and/or operation flowcharts disclosed in the present document. Here, the processor 102 and the memory 104 may be a part of a communication modem/circuit/chip designed to implement the wireless communication technology (e.g., LTE, NR). The transceiver 106 may be connected to the processor 102 and transmit and/or receive wireless signals through one or more antennas 108. The transceiver 106 may include a transmitter and/or receiver. It is able to use the transceiver 106 mixed with a Radio Frequency (RF) unit. In the present disclosure, a wireless device may mean a communication modem/circuit/chip.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Example of Signal Processing Circuit to which the Present Disclosure is Applied

Figure 14:
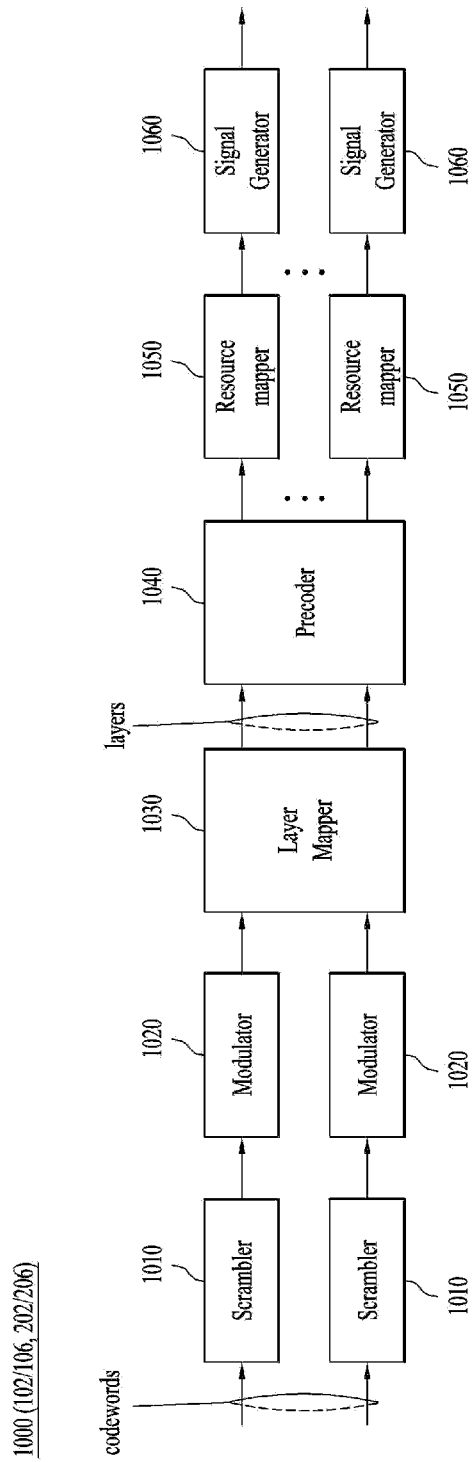
FIG. 14 is a diagram showing a signal processing circuit for a transmission signal to which one embodiment of the present disclosure is applicable.

FIG. 14 is a block diagram illustrating a signal processing circuit 1000 for transmission (Tx) signals to which one embodiment of the present disclosure can be applied.

Referring to FIG. 14, the signal processing circuit 1000 may include a scrambler 1010, a modulator 1020, a layer mapper 1030, a precoder 1040, a resource mapper 1050, and a signal generator 1060. The operations/functions shown in FIG. 14 may be performed by the processors 102 and 202 and/or the transceivers 106 and 206 shown in FIG. 13, without being limited thereto. Hardware elements shown in FIG. 14 may be implemented by the processors 102 and 202 and/or the transceivers 106 and 206 shown in FIG. 13. For example, the blocks 1010 to 1060 may be implemented by the processors 102 and 202. In addition, the blocks 1010 to 1050 may be implemented by the processors 102 and 202 shown in FIG. 13, and the block 1060 may be implemented by the transceivers 106 and 206 shown in FIG. 13.

The codeword may be converted into a radio signal (or a radio frequency (RF) signal) through the signal processing circuit 1000 shown in FIG. 14. Here, the codeword may be a coded bit sequence of an information block. The information block may include a transmission (Tx) block (e.g., UL-SCH transmission block, and/or DL-SCH transmission block). The radio signal may be transmitted through various physical channels (e.g., PUSCH, and PDSCH).

In more detail, the codeword may be converted into a bit sequence scrambled by the scrambler 1010. The scramble sequence used for such scrambling may be generated based on an initialization value, and the initialization value may include ID information of a wireless device, etc. The scrambled bit-sequence may be modulated into a modulated symbol sequence by the demodulator 1020. The modulation scheme may include pi/2-BPSK(pi/2-Binary Phase Shift Keying), m-PSK(m-Phase Shift Keying), m-QAM(m-Quadrature Amplitude Modulation), etc. The complex modulated symbol sequence may be mapped to one or more transmission (Tx) layers by the layer mapper 1030. Modulated symbols of the respective Tx layers may be mapped (precoded) to the corresponding antenna port(s) by the precoder 1040. The output value (z) of the precoder 1040 may be obtained by multiplying the output value (y) of the layer mapper 1030 by the (N×M) precoding matrix (W). In this case, N is the number of antenna ports, and M is the number of Tx layers. In this case, the precoder 1040 may perform precoding after transform precoding (e.g., DFT transform) is performed on the complex modulated symbols. In this case, the precoder 1040 may perform precoding without performing transform precoding.

The resource mapper 1050 may map the modulated symbols of the respective antenna ports to time-frequency resources. The time-frequency resources may include a plurality of symbols (e.g., CP-OFDMA symbol and DFT-s-OFDMA symbol) in the time domain, and may include a plurality of subcarriers in the frequency domain. The signal generator 1060 may generate radio signals from the mapped modulated symbols, and the generated radio signals may be transferred to other devices through the respective antennas. To this end, the signal generator 1060 may include an Inverse Fast Fourier Transform (IFFT) module, a Cyclic Prefix (CP) inserter, a Digital-to-Analog Converter (DAC), a frequency uplink converter, etc.

The signal processing steps for reception (Rx) signals in the wireless device may be arranged in the reverse order of the signal processing steps 1010 to 1060 shown in FIG. 14. For example, the wireless devices 100 and 200 (shown in FIG. 4) may receive radio signals from the outside through the antenna ports/transceivers. The received radio signals may be converted into a baseband signal through a signal restorer. To this end, the signal restorer may include a frequency downlink converter, an analog-to-digital converter (ADC), a CP remover, and a Fast Fourier Transform (FFT) module. Thereafter, the baseband signal may be restored to the codeword after passing through the resource demapper process, the postcoding process, the demodulation process, and the descrambling process. The codeword may be restored to an original information block through decoding. Therefore, the signal processing circuit (not shown) for Rx signals may include a signal restorer, a resource demapper, a postcoder, a demodulator, a descrambler, and a decoder.

Example of Wireless Device to which the Present Disclosure is Applied

Figure 15:
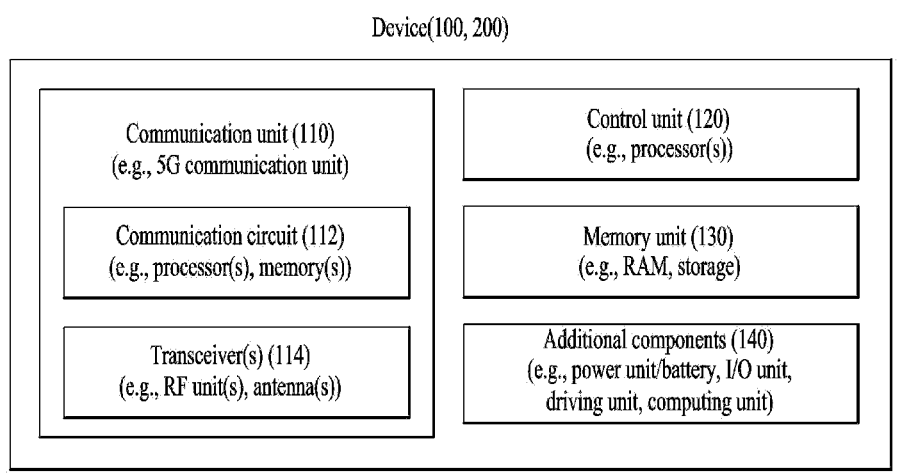
FIG. 15 is a block diagram showing a wireless device to which another embodiment of the present disclosure is applicable.

FIG. 15 illustrates another example of a wireless device applied to the present disclosure. The wireless device may be implemented in various forms according to a use case/service (refer to FIGS. 12, 16, 17 and 18).

Referring to FIG. 15, a wireless device 100/200 corresponds to the wireless device 100/200 shown in FIG. 13 and may include various elements, components, units/parts and/or modules. For example, the wireless device 100/200 may include a communication unit 110, a control unit 120, a memory unit 130 and an additional component 140. The communication unit 110 may include a communication circuit 112 and transceiver(s) 114. For example, the communication circuit 112 may include one or more processors 102/202 and/or one or more memories 104/204 shown in FIG. 13. For example, the transceiver(s) 114 may include one or more transceivers 106/206 and/or one or more antennas 108/208. The control unit 120 is electrically connected to the communication unit 110, the memory unit 130 and the additional component 140 and controls overall operations of the wireless device. For example, based on the program/code/command/information stored in the memory unit 130, the control unit 120 may control electrical/mechanical operations of the wireless device. In addition, the control unit 120 may transmit information stored in the memory unit 130 to an external device (e.g., another communication device) through the communication unit 110 via a wire/wireless interface or save information received from an external device (e.g., another communication device) through the communication unit 110 via the wire/wireless interface to the memory unit 130. For example, the control unit 120 may be configured to implement at least one operation for the methods described with reference to FIG. 10 or FIG. 11. For example, the control unit 120 may be configured to select a transmission resource and control the communication unit 110 to transmit a signal on the selected transmission resource to another UE. The transmission resource may include a first transmission resource region for transmission of a first signal and a second transmission resource region for transmission of a second signal, wherein the second transmission resource region is greater than the first transmission resource region. The first and second transmission resource regions may be mapped to different subchannel indices. The first transmission resource region may be allocated to the edges of a frequency region for transmitting the first and second signals.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100a of FIG. 12), the vehicles (100b-1 and 100b-2 of FIG. 12), the XR device (100c of FIG. 12), the hand-held device (100d of FIG. 12), the home appliance (100e of FIG. 12), the IoT device (100f of FIG. 12), a digital broadcasting terminal, a hologram device, a public safety device, an MTC device, a medical device, a FinTech device (or a finance device), a security device, a climate/environment device, the AI server/device (400 of FIG. 12), the BSs (200 of FIG. 12), a network node, or the like. The wireless device may be mobile or fixed according to a use case/service.

In FIG. 15, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

The implementation example of FIG. 15 will hereinafter be described with reference to the attached drawings.

Example of Hand-held device to which the Present Disclosure is Applied

Figure 16:
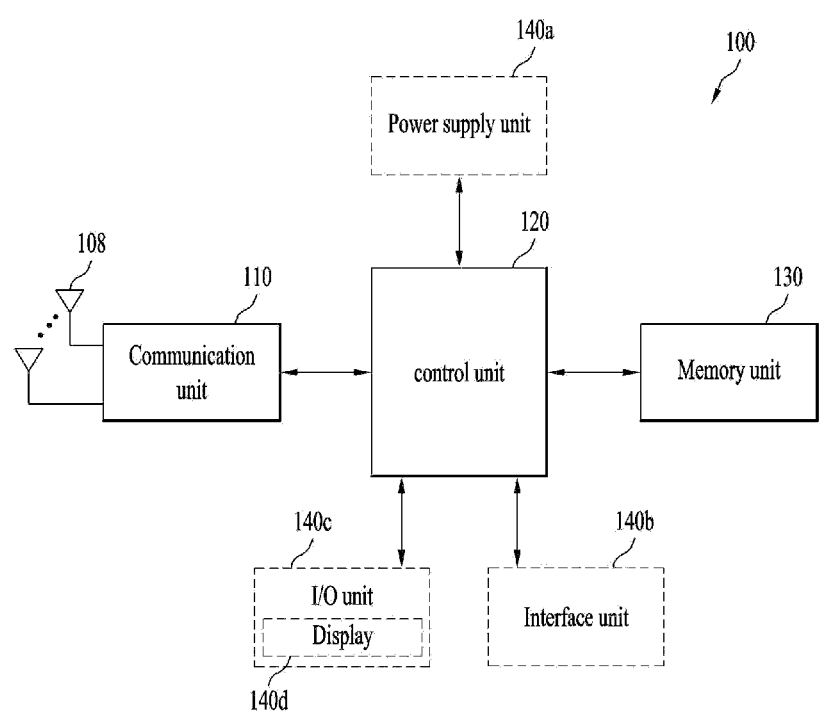
FIG. 16 is a block diagram showing a portable device to which another embodiment of the present disclosure is applicable.

FIG. 16 is a block diagram illustrating a hand-held device 100 to which another embodiment of the present disclosure can be applied. The hand-held device may include a smartphone, a tablet (also called a smartpad), a wearable device (e.g., a smartwatch or smart glasses), and a portable computer (e.g., a laptop). The hand-held device 100 may be referred to as a mobile station (MS), a user terminal (UT), a mobile subscriber station (MSS), a subscriber station (SS), an advanced mobile station (AMS), or a wireless terminal (WT).

Referring to FIG. 16, the hand-held device 100 may include an antenna unit 108, a communication unit 110, a control unit 120, a memory unit 130, a power supply unit 140a, an interface unit 140b, and an input/output (I/O) unit 140c. The antenna unit 108 may be configured as a part of the communication unit 110. The blocks 110 to 130/140a to 140c correspond to the blocks 110 to 130/140 of FIG. 15, respectively.

The communication unit 110 may transmit and receive signals (e.g., data and control signals) to and from another wireless device and a BS. The control unit 120 may perform various operations by controlling elements of the hand-held device 100. The control unit 120 may include an application processor (AP). The memory unit 130 may store data/parameters/programs/code/commands required for operation of the hand-held device 100. Further, the memory unit 130 may store input/output data/information. The power supply unit 140a may supply power to the hand-held device 100, and include a wired/wireless charging circuit and a battery. The interface unit 140b may support connection between the hand-held device and other external devices. The interface unit 140b may include various ports (e.g., an audio I/O port and a video I/O port) for connection to external devices. The I/O unit 140c may receive or output video information/signal, audio information/signal, data, and/or user-input information. The I/O unit 140c may include a camera, a microphone, a user input unit, a display 140d, a speaker, and/or a haptic module.

For example, for data communication, the I/O unit 140c may acquire information/signals (e.g., touch, text, voice, images, and video) received from the user and store the acquired information/signals in the memory unit 130. The communication unit 110 may convert the information/signals into radio signals and transmit the radio signals directly to another device or to a BS. Further, the communication unit 110 may receive a radio signal from another device or a BS and then restore the received radio signal to original information/signal. The restored information/signal may be stored in the memory unit 130 and output in various forms (e.g., text, voice, an image, video, and a haptic effect) through the I/O unit 140c.

Figure 17:
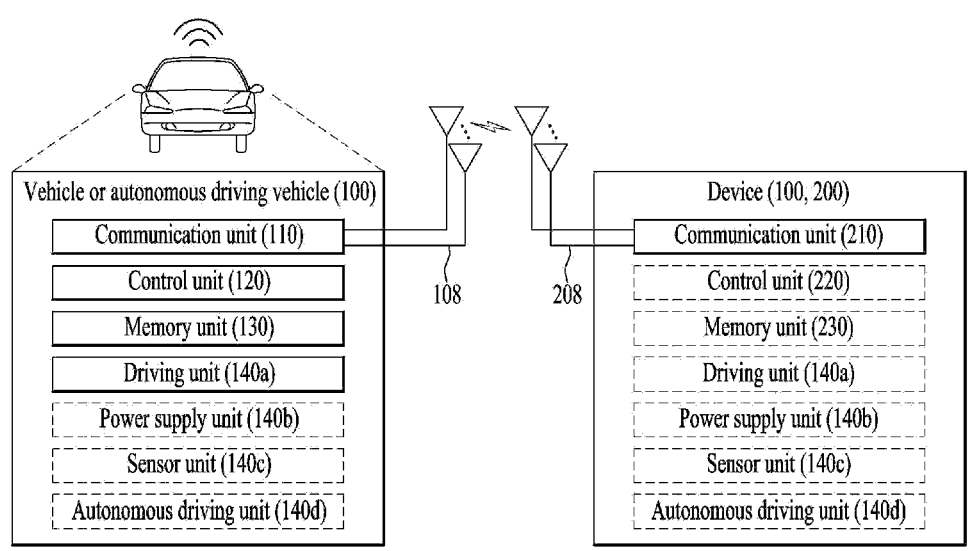
FIG. 17 is a block diagram showing a vehicle or an autonomous vehicle to which another embodiment of the present disclosure is applicable.

Example of Vehicle or Autonomous Driving Vehicle to which the Present Disclosure is Applied FIG. 17 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 17, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 16, respectively.

The communication unit 110 may transmit and receive signals (e.g., data, control signals, etc.) with external devices such as another vehicle, a base station (e.g., a base station, a road side unit, etc.), a server and the like. The control unit 120 may perform various operations by controlling elements of a vehicle or autonomous vehicle 100. The control unit 120 may include an Electronic Control Unit (ECU). For example, the control unit 120 may be configured to implement at least one operation for the methods described above in relation to FIG. 10 or FIG. 11. For example, the control unit 120 may be configured to select a transmission resource and control the communication unit 110 to transmit a signal on the selected transmission resource to another UE. The transmission resource may include a first transmission resource region for transmission of a first signal and a second transmission resource region for transmission of a second signal, wherein the second transmission resource region is greater than the first transmission resource region. The first and second transmission resource regions may be mapped to different subchannel indices. The first transmission resource region may be allocated to the edges of a frequency region for transmitting the first and second signals.

The driving unit 140a may enable the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire information about a vehicle state, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140d may generate an autonomous driving route and a driving plan from the obtained data. The control unit 120 may control the driving unit 140a such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140c may obtain information about a vehicle state and/or surrounding environment information. The autonomous driving unit 140d may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

Example of Augmented Reality (AR)/Virtual Reality (VR) and Vehicle

Figure 18:
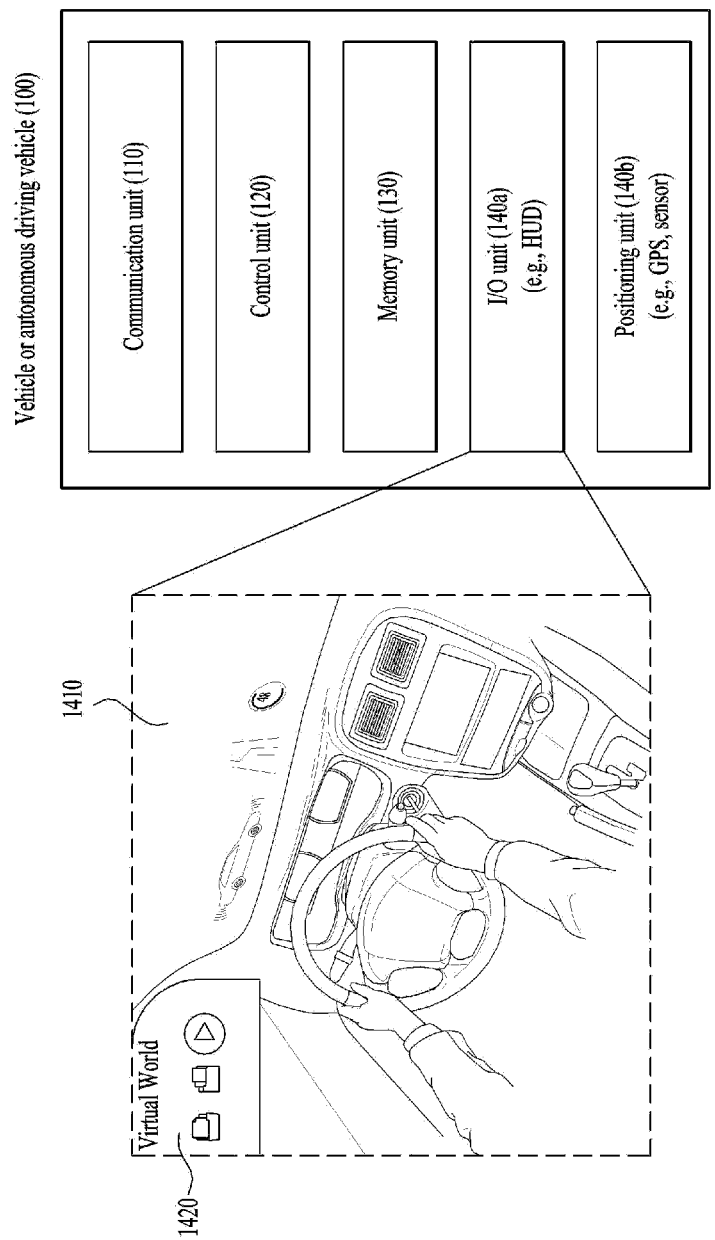
FIG. 18 is a diagram showing a vehicle to which another embodiment of the present disclosure is applicable.

FIG. 18 illustrates a vehicle or an autonomous driving vehicle 100 to which another embodiment of the present disclosure can be applied. The vehicle or autonomous driving vehicle may be configured as a transportation means, a train, an aircraft, a ship, or the like.

Referring to FIG. 18, the vehicle 100 may include a communication unit 110, a control unit 120, a memory unit 130, an I/O unit 140a, and a position measurement unit 140b. The blocks 110 to 130/140a to 140c correspond to the blocks 110 to 130/140 of FIG. 16, respectively.

The communication unit 110 may transmit and receive signals (e.g., data and control signals) to and from external devices such as other vehicles or BSs. The control unit 120 may perform various operations by controlling elements of the vehicle 100. The memory unit 130 may store data/parameters/programs/code/commands required for operation of the hand-held device 100. The I/O unit 140a may output AR/VR objects based on information stored in the memory unit 130. The I/O unit 140a may include a head-up display (HUD). The position measurement unit 140b may acquire position information of the vehicle 100. The position information of the vehicle 100 may include absolute position information of the vehicle 100, position information within a vehicle traveling lane, acceleration information, position information about peripheral vehicles, etc. The position measurement unit 140b may include various sensors.

For example, the communication unit 110 of the vehicle 100 may receive map data, traffic information data, and so on from an external server, and may store the received information in the memory unit 130. The position measurement unit 140b may acquire position information of the vehicle 100 through GPS and various sensors, and may store the acquired information in the memory unit 130. The controller 130 may generate a virtual object based on map information, traffic information, vehicle position information, etc. The I/O unit 140b may display the virtual object on a windshield of the vehicle, as represented by 1410 and 1420. In addition, the controller 120 may determine whether the vehicle 100 is normally driving in the traveling lane based on vehicle position information. If the vehicle 100 abnormally deviates from the traveling lane, the control unit 140 may display a warning message on the windshield of the vehicle 100. In addition, the control unit 120 may broadcast a warning message indicating an abnormal driving state to the peripheral vehicles through the communication unit 110. In accordance with various situations, the controller 120 may control the communication unit 110 to transmit vehicle position information, information about abnormal driving, and information about an abnormal vehicle state to the organizations concerned.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by a subsequent amendment after the application is filed.

The embodiments of the present disclosure have been described above, focusing on the signal transmission and reception relationship between a UE and a BS. The signal transmission and reception relationship is extended to signal transmission and reception between a UE and a relay or between a BS and a relay in the same manner or a similar manner A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with the term fixed station, Node B, enhanced Node B (eNode B or eNB), access point, and so on. Further, the term UE may be replaced with the term terminal, mobile station (MS), mobile subscriber station (MSS), and so on.

The embodiments of the present disclosure may be achieved by various means, for example, hardware, firmware, software, or a combination thereof. In a hardware configuration, the methods according to the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present disclosure may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The above-mentioned embodiments of the present disclosure are applicable to various mobile communication systems.

The invention claimed is:

1. A method of transmitting a signal by a user equipment (UE) in a wireless communication system, the method comprising:
    selecting, by the UE, a transmission resource; and
    transmitting the signal on the selected transmission resource to another UE,
    wherein the transmission resource includes a first transmission resource region for transmission of a first signal and a second transmission resource region for transmission of a second signal,
    wherein the second transmission resource region is greater in frequency range than the first transmission resource region,
    wherein the first and second transmission resource regions are mapped to different subchannel indices,
    wherein the first signal is a narrowband signal, and wherein the second signal is a wideband signal, and
    wherein the first transmission resource region related to the narrowband signal is allocated to an edge of a frequency region for transmitting the first and second signals,
    wherein based on the signal corresponding to the wideband signal, the UE transmits control information before transmitting the signal with a predetermined time gap,
    wherein the time gap is related to dropping reserved narrowband transmissions of another UE that overlap with the resources used for transmitting the wideband signal,
    wherein the time gap is determined based on the frequency size of the wide band signal.

2. The method of claim 1,
    wherein the first transmission resource region is mapped to a subchannel index greater than a first threshold or smaller than a second threshold,
    wherein the second transmission resource region is mapped to a subchannel index smaller than or equal to the first threshold and greater than or equal to the second threshold, and
    wherein the first threshold is greater than the second threshold.

3. The method of claim 1, wherein the first transmission resource region is mapped to a minimum subchannel index and a maximum subchannel index, and wherein the second transmission resource region is mapped to a subchannel index except the minimum and maximum subchannel indices.

4. The method of claim 1, wherein transmitting the signal comprises:
    based on that an amount of resources for transmitting the signal is greater than or equal to a third threshold, transmitting the signal as the second signal in the second resource region; and
    based on that the amount of resources for transmitting the signal is smaller than the third threshold, transmitting the signal as the first signal in the first resource region.

5. The method of claim 1, further comprising, based on that the first transmission resource region overlaps with the second transmission resource region, dropping the transmission of the first signal or reselecting the first transmission resource.

6. The method of claim 1, further comprising configuring and transmitting a time gap between control and data signals for the second signal.

7. The method of claim 1, wherein the first and second transmission resource regions are configured within a resource pool for transmission of a sidelink signal.

8. A user equipment (UE) for transmitting a signal in a wireless communication system, the UE comprising:
    a transceiver; and
    a processor configured to:
    select a transmission resource; and
    transmit the signal on the selected transmission resource to another UE,
    wherein the transmission resource includes a first transmission resource region for transmission of a first signal and a second transmission resource region for transmission of a second signal,
    wherein the second transmission resource region is greater in frequency range than the first transmission resource region,
    wherein the first and second transmission resource regions are mapped to different subchannel indices, and
    wherein the first transmission resource region related to the narrowband signal is allocated to an edge of a frequency region for transmitting the first and second signals,
    wherein based on the signal corresponding to the wideband signal, the UE transmits control information before transmitting the signal with a predetermined time gap,
    wherein the time gap is related to dropping reserved narrowband transmissions of another UE that overlap with the resources used for transmitting the wideband signal,
    wherein the time gap is determined based on the frequency size of the wide band signal.

9. The UE of claim 8, wherein the UE is configured to communicate with at least one of a mobile terminal, a network, or an autonomous driving vehicle other than an apparatus.

10. The UE of claim 8, wherein the UE is configured to implement at least one advanced driver assistance system (ADAS) function based on a signal for controlling movement of the UE.

11. The UE of claim 8, wherein the UE is configured to switch a driving mode of an apparatus from an autonomous driving mode to a manual driving mode or from the manual driving mode to the autonomous driving mode upon receipt of a user input.

12. The UE of claim 8, wherein the UE is configured to perform autonomous driving based on external object information, and wherein the external object information includes at least one of information about presence of an object, information about a location of the object, information about a distance between the UE and the object, or information about a relative speed of the UE with respect to the object.

* * * * *